(12) United States Patent
Sako et al.

(10) Patent No.: US 6,487,293 B2
(45) Date of Patent: *Nov. 26, 2002

(54) METHOD AND APPARATUS FOR REPRODUCING CIPHERED DATA

(75) Inventors: Yoichiro Sako, Chiba (JP); Isao Kawashima, Kanagawa (JP); Akira Kurihara, Kanagawa (JP); Yoshitomo Osawa, Kanagawa (JP); Hideo Owa, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/152,725

(22) Filed: Sep. 14, 1998

(65) Prior Publication Data

US 2001/0046295 A1 Nov. 29, 2001

Related U.S. Application Data

(62) Division of application No. 08/793,755, filed as application No. PCT/JP96/01675 on Mar. 24, 1997, now Pat. No. 5,901,127.

(30) Foreign Application Priority Data

Jun. 30, 1995 (JP) ............................................. 7-166698
Jun. 30, 1995 (JP) ............................................. 7-187967

(51) Int. Cl.[7] ............................................. H04N 7/167

(52) U.S. Cl. .................... 380/201; 380/28; 380/277; 380/268; 369/47.1; 369/59.1; 713/193

(58) Field of Search ..................... 369/47, 59; 380/28, 380/26, 201, 277, 268; 713/193

(56) References Cited

U.S. PATENT DOCUMENTS 4,396,802 A * 8/1983 Hurst ........................... 380/53
4,433,207 A * 2/1984 Best ............................ 713/190

(List continued on next page.)

FOREIGN PATENT DOCUMENTS

| EP | 0 310 330 A2 | 4/1989 |
| EP | 0 421 871 A2 | 4/1991 |
| EP | 0 533 204 A2 | 3/1993 |
| GB | 2 112 971 A | 7/1983 |
| JP | 03173238 | * 12/1989 |
| WO | WO 95/03655 | 2/1995 |

OTHER PUBLICATIONS

Rogaway, "Comments—Problems with Proposed IP Cryptography," http://wwwcsif.cs.ucdavis.edu/~rogaway/papers/draft-rogaway-ipsec-comments-00.txt[internet], Apr. 1995.*

(List continued on next page.)

Primary Examiner—Gilberto Barron
Assistant Examiner—Paul E. Callahan
(74) Attorney, Agent, or Firm—Frommer Lawrence & Haug LLP; William S. Frommer; Glenn F. Savit

(57) ABSTRACT

A data reproducing apparatus and method is provided for reproducing data that was ciphered during recording in one or more of sector forming, header appending, error correction coding, modulation, and synchronization appending operations used for processing input data to form a recording signal. Thus, deciphering requires knowledge of both the ciphering key and the aspect(s) of the recording operation in which the ciphering took place. The deciphering may also include a descrambling operation in which an initial value and/or a generating polynomial is varied in accordance with ciphering key information.

16 Claims, 29 Drawing Sheets

U.S. PATENT DOCUMENTS

| | | | | |
|---|---|---|---|---|
| 4,788,685 A | * | 11/1988 | Sako et al. | 371/38 |
| 4,797,672 A | * | 1/1989 | Kousa | 340/825.3 |
| 4,805,046 A | | 2/1989 | Kuroki et al. | 360/49 |
| 4,965,804 A | * | 10/1990 | Trbovich et al. | 713/153 |
| 5,166,977 A | * | 11/1992 | Ross | 380/243 |
| 5,175,655 A | | 12/1992 | Satomura | 360/53 |
| 5,319,705 A | * | 6/1994 | Halter et al. | 705/54 |
| 5,365,589 A | * | 11/1994 | Gutowitz | 380/43 |
| 5,555,304 A | * | 9/1996 | Hasebe et al. | 380/4 |
| 5,559,999 A | * | 9/1996 | Maturi et al. | 713/400 |
| 5,568,461 A | * | 10/1996 | Nishiuchi et al. | 369/44.26 |
| 5,732,066 A | * | 3/1998 | Moriya et al. | 369/275.3 |
| 5,757,909 A | * | 5/1998 | Park | 380/201 |
| 5,796,826 A | * | 8/1998 | Park | 380/203 |
| 5,850,379 A | * | 12/1998 | Moriya et al. | 369/59 |
| 5,901,127 A | * | 5/1999 | Sako et al. | 369/59 |
| 5,983,350 A | * | 11/1999 | Minear et al. | 713/201 |
| 6,035,040 A | * | 3/2000 | Mann et al. | 380/28 |

OTHER PUBLICATIONS

Patent Abstract of Japan, vol. 017, No. 231 (P–1532), May 11, 1993 & JP 04 360068 A (Mitsubushi Electric Corp), Dec. 14, 1992.

Patent Abstracts of Japan, vol. 095, No. 006, Jul. 31, 1995 & JP 07 085574 A (Victor Co. of Japan Ltd), Mar. 31, 1995.

Patent Abstracts of Japan, vol. 095, No. 004, May 31, 1995 & JP 07 021688 A (Victor Co of Japan Ltd), Jan. 24, 1995.

Patent Abstracts of Japan, vol. 095, No. 001, Feb. 28, 1995 & JP 06 290542 A (Mitsubishi Electric Corp), Oct. 18, 1994.

Patent Abstracts of Japan, vol. 018, No. 135 (P–1705), Mar. 7, 1994 & JP 05 314652 A (Sony Corp) Nov. 26, 1993.

Patent Abstracts of Japan, vol. 009, No. 269 (P–400), Oct. 26, 1985 & JP 60 116030 A (Shimazu Seisakusho KK), Jun. 22, 1985.

* cited by examiner

| SELECTION NUMBERS | PRE-SET VALUES | SELECTION NUMBERS | PRE-SET VALUES |
|---|---|---|---|
| 0 | $0001 | 8 | $4080 |
| 1 | $4000 | 9 | $2040 |
| 2 | $2000 | 10 | $1020 |
| 3 | $1000 | 11 | $0810 |
| 4 | $0800 | 12 | $0408 |
| 5 | $0400 | 13 | $0204 |
| 6 | $0200 | 14 | $0102 |
| 7 | $0100 | 15 | $4081 |

FIG.5

| POSITION | +0 | +1 | +2 | +3 | SIZE |
|---|---|---|---|---|---|
| 0 | SYNCHRONIZATION | | | | 4 |
| 4 | HEADER | | | | 16 |
| 20 | USER DATA | | | | 2048 |
| 2068 | ERROR DETECTION SIGNAL (EDC) | | | | 46 |

SUM OF SIZE : 2072 BYTES

| SYNCHRONIZATION WORDS | CODE WORDS | | | |
|---|---|---|---|---|
| | SYNCHRONIZATION PATTERN a | | SYNCHRONIZATION PATTERN b | |
| | msb ... lsb | | msb ... lsb | |
| S0 | 0001001001000000000010000000000001 | | 1001001001000000000010000000000001 |
| S1 | 0001000001000000000010000000000001 | | 1001000001000000000010000000000001 |
| S2 | 0000001001000000000010000000000001 | | 1000001001000000000010000000000001 |
| S3 | 0001000001000000000010000000000001 | | 1000100001000000000010000000000001 |

FIG.14

| SELECTION NUMBERS | PRE-SET VALUES | SELECTION NUMBERS | PRE-SET VALUES |
|---|---|---|---|
| 0 | $0001 | 8 | $0010 |
| 1 | $5500 | 9 | $5000 |
| 2 | $0002 | 10 | $0020 |
| 3 | $2A00 | 11 | $2001 |
| 4 | $0004 | 12 | $0040 |
| 5 | $5400 | 13 | $4002 |
| 6 | $0008 | 14 | $0080 |
| 7 | $2800 | 15 | $0005 |

FIG.24

STATES 1 AND 2

```
       (MSB)                                            (LSB)    (MSB)                                            (LSB)
SY0 = 0001001001000100 / 0000000000010001 / 0001001000000100 / 0000000000010001
SY1 = 0000010000000100 / 0000000000010001 / 0000010001000100 / 0000000000010001
SY2 = 0001000000000100 / 0000000000010001 / 0001000001000100 / 0000000000010001
SY3 = 0001000000000100 / 0000000000010001 / 0001000101000100 / 0000000000010001
SY4 = 0010000000000100 / 0000000000010001 / 0010000101000100 / 0000000000010001
SY5 = 0010001001000100 / 0000000000010001 / 0010000100000100 / 0000000000010001
SY6 = 0010010010000100 / 0000000000010001 / 0010000010000100 / 0000000000010001
SY7 = 0010010001000100 / 0000000000010001 / 0010010100000100 / 0000000000010001
```

FIG.30A

STATES 3 AND 4

```
       (MSB)                                            (LSB)    (MSB)                                            (LSB)
SY0 = 1001001000000100 / 0000000000010001 / 1001001001000100 / 0000000000010001
SY1 = 1000010001000100 / 0000000000010001 / 1000010000000100 / 0000000000010001
SY2 = 1001000001000100 / 0000000000010001 / 1001000000000100 / 0000000000010001
SY3 = 1000001001000100 / 0000000000010001 / 1000010000000100 / 0000000000010001
SY4 = 1000100000010100 / 0000000000010001 / 1000100000000100 / 0000000000010001
SY5 = 1000100100000100 / 0000000000010001 / 1000000100000100 / 0000000000010001
SY6 = 1001000010000100 / 0000000000010001 / 1000000010000100 / 0000000000010001
SY7 = 1000100010000100 / 0000000000010001 / 1000000010000100 / 0000000000010001
```

FIG.30B

METHOD AND APPARATUS FOR REPRODUCING CIPHERED DATA

This application is a divisional of application Ser. No. 08/793,755, PCT filed Jun. 18, 1996, now U.S. Pat. No. 5,901,127.

TECHNICAL FIELD

This invention relates to a data recording method and apparatus, a data record medium and a data reproducing method and apparatus applicable to prevention of copying or inhibition of unauthorized use and to a charging system.

BACKGROUND ART

Recently, with increased capacity and coming into widespread use of a digital record (recording, recordable or recorded) medium, increasing importance is attached to prevention of copying or inhibition of unauthorized use. That is, since digital audio data or digital video data can be duplicated free of deterioration by copying or dubbing, while computer data an be easily copied to produce the same data as the original data, unauthorized copying is made frequently.

For avoiding unauthorized copying of the digital audio or video data, there is known a standard such as a so-called serial copying management system (SCMS) or copy generation management system (CGMS). Since these systems set a copying inhibition flag on a specified portion of record data, a problem is raised that data can be extracted by dump copying which is the copying of a digital bi-level signal in its entirety.

It is also practiced to cipher the contents of a file itself in case of computer data and to permit use only by regular registered user, as disclosed in, for example, Japanese Patent laid-Open No. SHO-60-116030. This is connected to a system in which a digital record medium having the ciphered information recorded thereon is distributed as a form of information circulation and in which the user pays a fee for the information he or she needs to acquire a key to decipher the information for use. For this system, a simplified useful technique for ciphering has been a desideratum.

In view of the above-depicted status of the art, it is an object of the present invention to provide a data recording method and apparatus, a data record medium and a data reproducing method and apparatus whereby ciphering can be realized by a simplified structure, prevention of copying or unauthorized use can be achieved by a simplified configuration, deciphering is rendered difficult and relative facility or depth of ciphering can be controlled easily.

DISCLOSURE OF THE INVENTION

The recording method according to the present invention is characterized in that an input is ciphered in at least one of a sector forming step of dividing input digital data in terms of a pre-set data volume as a unit, a header appendage step, an error correction and decoding step, a modulation step for effecting modulation in accordance with a pre-set modulation system, or a synchronization appendage step for appendage of a synchronization pattern. A scrambling step of effecting randomizing for eliminating the same pattern may be included among the steps that can be used for ciphering.

This data recording method can be applied to a data recording apparatus.

A data reproducing method according to the present invention is characterized in that, in reproducing a data record medium recorded in the above data recording method, an input has been ciphered in a recording step corresponding to at least one of a synchronization separation step, a demodulating step, an error correction and decoding step, a sector resolving step and a header separation step, and in that the input is decoded in a reproducing step corresponding to the recording step used for ciphering. A descrambling step of descrambling for scrambling used for recording may be included among the steps that can be used for deciphering.

The data reproducing method can be applied to a data reproducing apparatus.

With the data recording method according to the present invention, the above object is accomplished by ciphering the data using the pre-set key information and by using the information written in an area different from a data recording area of the record medium as at least a portion of the key information for ciphering. This can be applied to the data recording apparatus and to a data record medium.

The data reproducing method according to the present invention is also characterized in that, in reproducing the digital signal ciphered during recording, deciphering is done using the key information at least part of which is the information written in an area different from a data recording area of the record medium.

This can be applied to a data reproducing apparatus.

The data recording method according to the present invention is also characterized by varying at least one of the initial value of the scrambling step or the generating polynominal depending on the key information for ciphering.

The data reproducing method according to the present invention is also characterized by. descrambling by varying at least one of the initial value or the generating polynominal based upon the key information used.for recording.

The input digital data is divided into sectors in terms of a pre-set data volume as a unit, and the resulting data is processed with header appendage, error correction and encoding, modulation by a pre-set modulation system and appendage of a synchronization pattern. for recording on a record medium. By ciphering an input in at least one of the above steps, the particular step in which ciphering has been done also becomes a key for ciphering thus raising the difficulty in deciphering.

At least a portion of the key information for ciphering is written in an area different from the recording area on the record medium. This portion of the key information is read out at the time of reproduction and used for deciphering. Since the key information is not completed with the information in the data recording area on the record medium, difficulty in deciphering is increased.

At least one of the generating polynominal or the initial value is varied depending on the key for ciphering at the time of scrambling aimed at randomization for removing the same pattern in a data string. Any conventional scrambling may be used for ciphering.

BRIEF DESCRIPTION OF THE DRAWINGS

FIG. 5 illustrates an example of pre-set values of the scrambler.

FIG. 14 illustrates a specified example of a sync word appended to a modulated signal.

FIG. 24 illustrates an example of pre-set values of the scrambler of FIG. 23.

FIG. 30 illustrates another specified example of a sync word appended to the modulated signal.

BEST MODE FOR CARRYING OUT THE INVENTION

Figure 1:
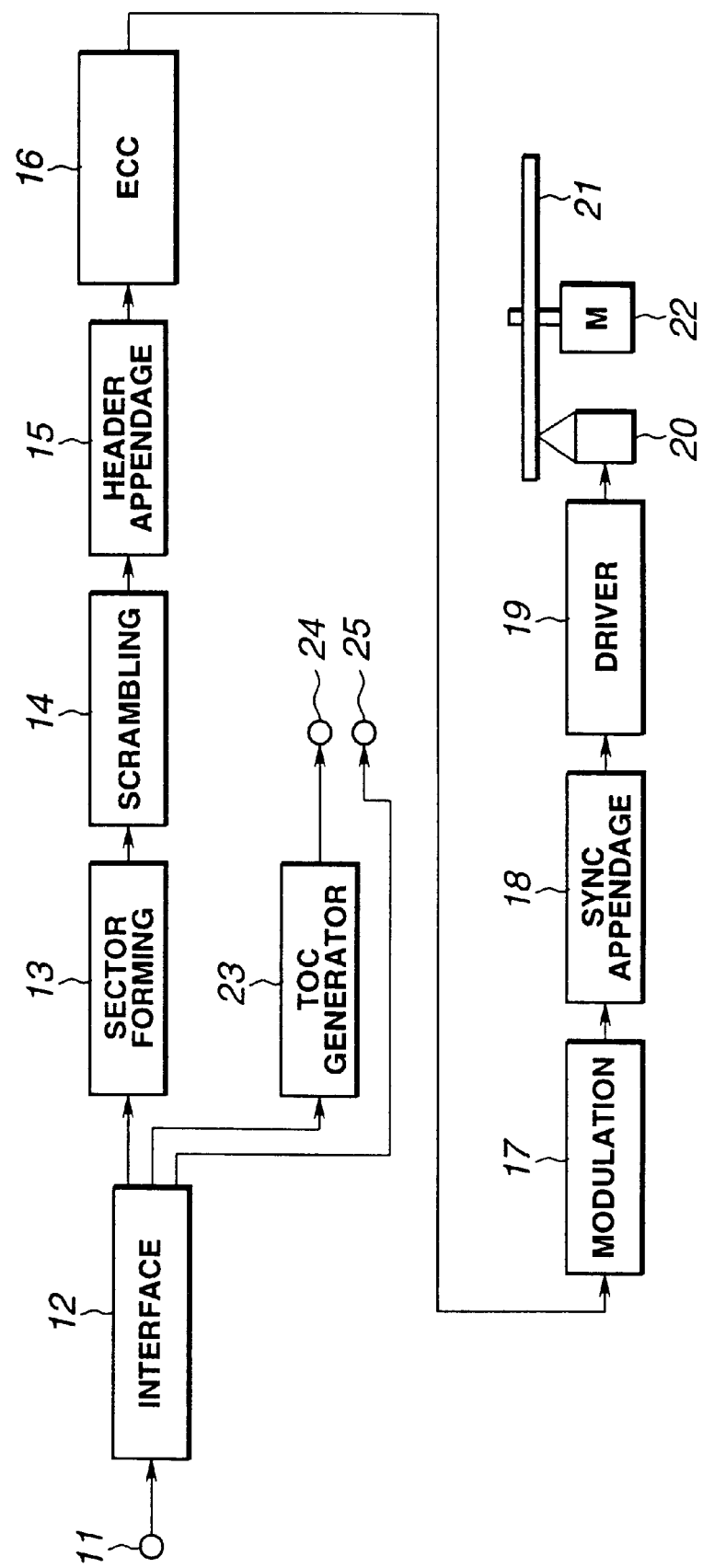
FIG. 1 is a schematic block diagram showing the configuration of a first embodiment of a data recording apparatus of the present invention.

Referring to the drawings, preferred embodiments of the present invention will be explained in detail.

FIG. 1 schematically shows a first embodiment of the present invention.

In FIG. 1, digital data, such as data obtained on digital conversion of analog audio or video signals or computer data, are fed to an input terminal 11. The input digital data is sent via an interfacing circuit 12 to a sector forming circuit 13 so as to be formed into sectors in terms of a pre-set data volume, such as 2048 bytes, as a unit. The data thus formed into sectors is sent to a scrambling circuit 14 for scrambling. For scrambling, the input data is randomized so that the same byte pattern will not be produced in succession, that is so that the same patterns will be eliminated, by way of randomizing, for enabling the signal to be read and recorded appropriately. The scrambled or randomized data is sent to a header appendage circuit 15 where header data to be arrayed at the leading end of each sector is appended and the resulting data is sent to an error correction encodina circuit 16. The error correction encoding circuit 16 delays the data and generates parity to append the generated parity. The next circuit, that is a modulation circuit 17, converts the 8-bit data into 16 channel-bit modulated data in accordance with a pre-set modulation rule and sends the resulting modulated data to a synchronization appendage circuit 18. The synchronization appendage circuit 28 appends a synchronization signal violating the modulation rule of the above pre-set modulation system, that is a so-called out-of-rule pattern synchronization signal, in terms of a pre-set data volume asa unit, and sends the resulting synchronization signal via a driving circuit, that is a driver 19, to a record head 20. The record head 20 performs optical or magneto-optical recording and records the modulated signal on the record medium. The disc-shaped record medium 21 is run in rotation by a spindle motor 22.

The scrambling circuit 14 is not essential. Moreover, the scrambling circuit 14 may be inserted downstream of the header appendage circuit 15 for scrambling the digital data having the header appended thereto. The digital data having the header appended thereto may be sent to the error correction encoding circuit 16.

It should be noted that at least one of the sector forming circuit 13, scrambling circuit 14, header appendage circuit 15, error correction encoding circuit 16, modulation circuit 17 and the synchronization appendage circuit 18 is configured for ciphering an input and outputting the resulting ciphered signal. Preferably, two or more circuits are used for ciphering. The key information for this ciphering uses, as at least a portion thereof, the identification information written in an area other than the data record area of the record medium 21, such as the identification information proper to the medium, the producer identification information, dealer identification information, the identification information proper to the record apparatus or the encoder, the identification information proper to the medium producing apparatus, such as a cutting machine or a stamper, the territory information, such as a country code or the identification information furnished from outside. Such identification information written in this manner in an area other than the data record area of the record medium is the information sent from the interfacing circuit 12 via a contents-contents (TOC) generating circuit 23 to a terminal 24, and is the information sent directly from the interfacing circuit 12 to a terminal 25. The identification information from these terminals 24, 25 is used as a portion of the key information for ciphering. At least one and preferably two or more of the circuits 13 to 18 perform ciphering on the input data using the key information. The identification information from these terminals 24, 25 is sent as appropriate to the record head 20 for recording on the record medium 21.

In this case, which. of the circuits 13 to 18 has performed ciphering represents one of the alternatives, and is felt to be a key necessary for producing the regular reproduced signal on reproduction. That is, if ciphering has been performed in one of the circuits, it becomes necessary to select one of six alternatives, whereas, if ciphering has been performed in two of the circuits, it becomes necessary to select one of 15 alternatives corresponding to the number of combinations of two out of six circuits. If there is the possibility of the ciphering operation performed in one to six of the six circuits 13 to 18, the number of alternatives is increased further, such that it becomes difficult to find the combination by a trial-and-error method, thus fulfilling the role of ciphering.

The key information for ciphering may be switched at a pre-set timing, for example, on the sector basis. In switching the key information at the pre-set timing, whether or not switching is to be made, the switching period or the switching sequence of the plural key information items may also be used as the key for further raising the ciphering level, ease or difficulty of ciphering, or difficulties in deciphering.

The construction of the circuits 13 to 18 and specified examples of ciphering will be explained.

Figure 2:
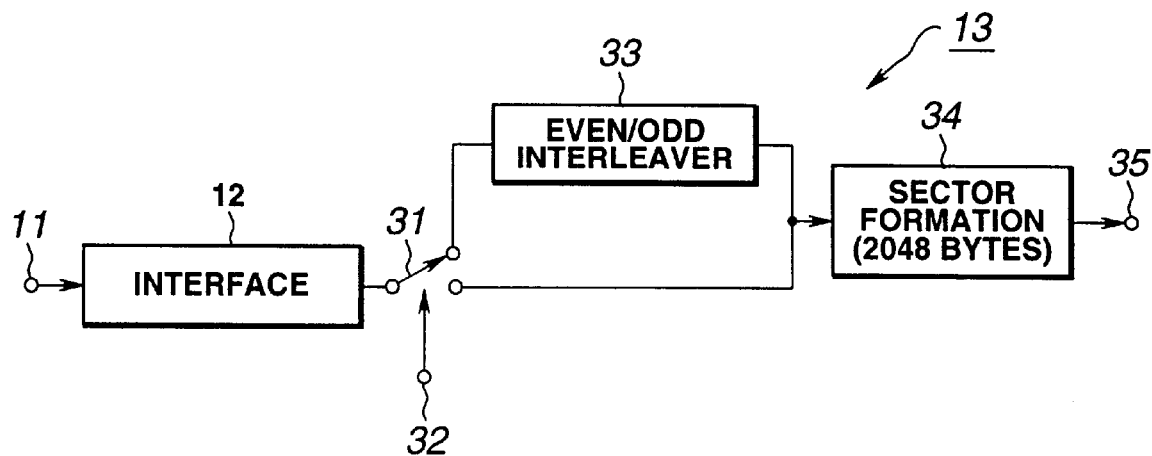
FIG. 2 is a block diagram showing an illustrative construction for realizing interleaving of even and odd bytes in a sector forming circuit.
Figure 3:
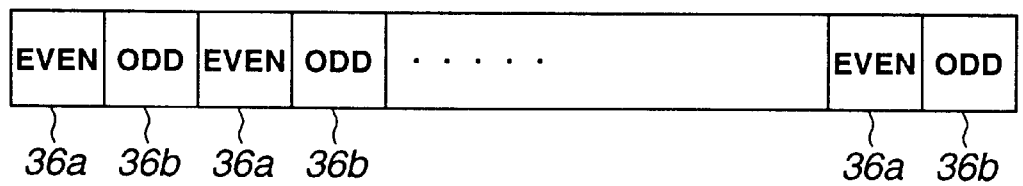
FIG. 3 illustrates interleaving of even and odd bytes.
Figure 3:
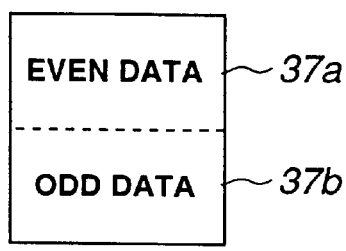
Figure 3:
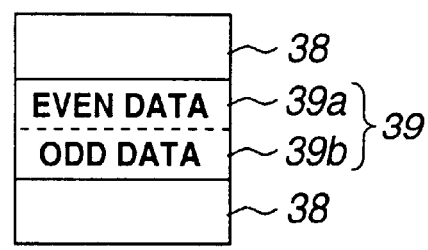

First, the sector forming circuit 13 may be designed for interleaving even and odd bytes, as shown for example in FIG. 2. That is, in FIG. 2, an output of the interfacing circuit 12 of FIG. 1 is sent to a two-output changeover switch 31, an output of which is sent via an even/odd interleaver 33 to a sector forming circuit 34 and the other output of which is directly sent to the sector-forming circuit 34. The sector-forming circuit 34 collects the input data in terms of 2048 bytes as unit to form one sector. The switching operation of the changeover switch 32 of the sector forming circuit 13 is controlled by a 1-bit control signal operating as the key. The even/odd interleaver 33 distributes one sector of the input data, having even bytes 36a and odd bytes 36f arrayed alternately as shown in FIG. 3A, into an even data portion 37a and an odd data portion 37b, as shown in FIG. 3, and outputs these data portions. Moreover, a specified portion 39 in a sector may be specified by the key information and data in only this specified portion 39 may be distributed into an even data portion 39a and an odd data portion 39b. In this case, the manner of specifying the portion 39 may be designed to be selected in plural methods for further increasing the number of the alternatives of the key information for raising the ciphering level.

Figure 4:
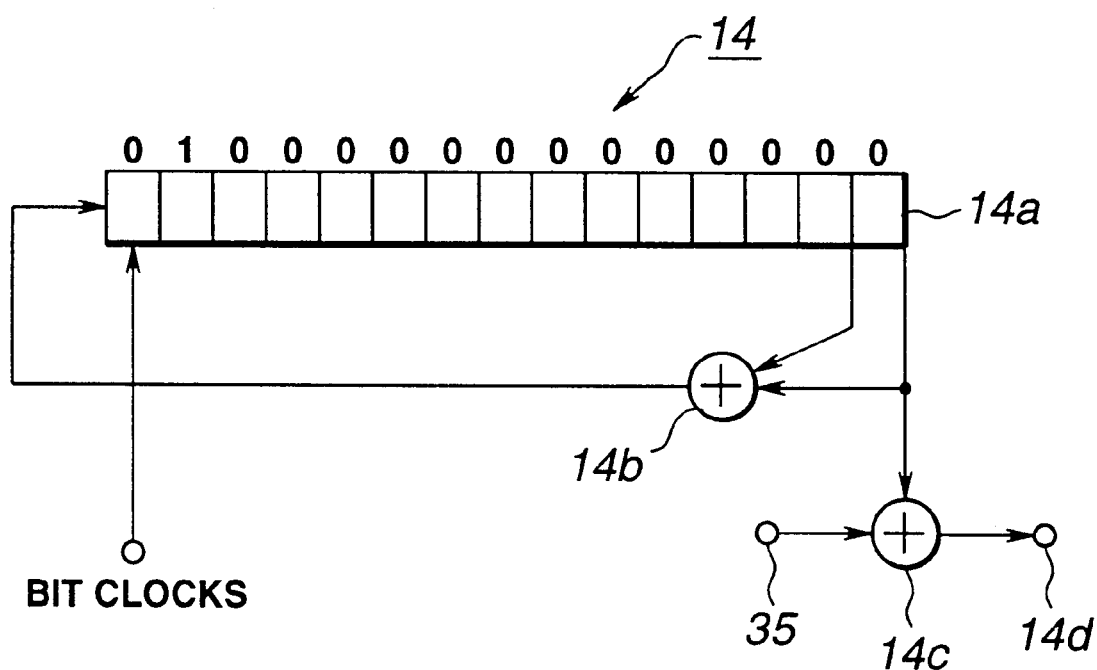
FIG. 4 illustrates an example of a scrambler.

The scrambling circuit 14 can use a scrambler of the so-called parallel block synchronization type employing a 15-bit shift register, as shown for example in FIG. 4. To a data input terminal 35 of the scrambler is supplied data from the sector forming circuit 13 in an order in which the least significant bit (LSB) comes temporally first, that is. in the so-called LSB first order. A 15-bit shift register 14a for scrambling is associated with an exclusive-OR (ExOR) circuit 14b for applying the feedback in accordance with the generating polynominal $x^{15}+x+1$. Thus, a pres-set value or an initial value as shown in FIG. 5 is set on the 15-bit shift register 14a. Meanwhile, the selection number of the pre-set value of FIG. 5 can be switched on the sector basis in association with, for example, the value of the lower four bits of the sector address. Output data of the shift register 14a and input data at a terminal 35 are ExORed by the ExOR circuit 14c so as to be taken out at a terminal 14d and sent to the header appendage circuit 15 of FIG. 1.

Figure 6:
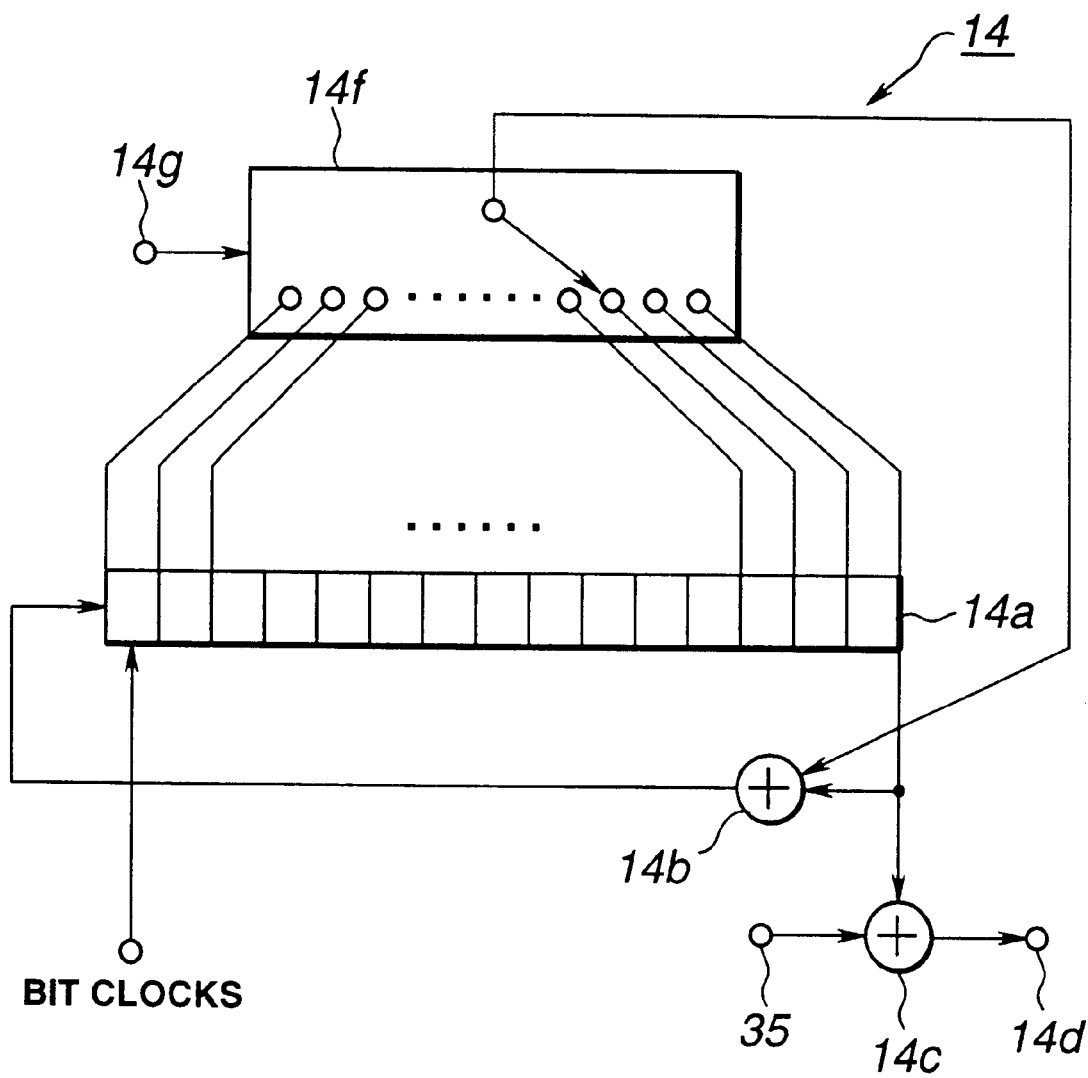
FIG. 6 illustrates an example of a scrambler having variable generating polynomials.

The generating polynominal and the pre-set value (initial value) may be varied in accordance with the key information, such as the pre-set identification number. That is, for varying the generating polynominal, the configuration as shown in FIG. 6 may be used. In FIG. 6, outputs of the respective bits of the 15-bit of the shift register 14a are sent to fixed terminals of the changeover switch 14f controlled by, for example, 4-bit control data from a control terminal 14g. An output of the changeover switch 14f is sent to the ExOR circuit 14b. By changing the control data of the control terminal 14g, it becomes possible to change the value of n in the generating polynominal $x^{15}+x^{n}+1$. For changing the pre-set value, the pre-set values of the pre-set value table of FIG. 5 may be processed with arithmetical operation with each byte value of the 16-byte identification information. The identification information may be enumerated by the identification information proper to the medium, the producer identification information, dealer identification information, the identification information proper to the recording apparatus or the encoder, the identification information proper to the medium producing apparatus, the territory information, or the identification information furnished from outside. The above information may be used in combination with one another or with the other information. The configuration for varying the generating polynominal is not limited to the configuration of FIG. 6, such that the number of taps or stages of the shift register may be changed as desired.

The header appendage circuit 15 is now explained.

Figures 7, 8:
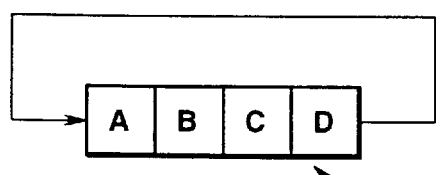
FIG. 7 illustrates an example of a sector format.
FIG. 8 illustrates an example of ciphering in a synchronization area in a sector.

FIG. 7 shows a specified example of the sector format. Each sector is made up of a 2048-byte user data area 41, to which are appended a 4-byte synchronization area 42, a 16-byte header area 43 and a 4-byte error detection code (EDC) 44. The error detection code of the error detection code area 44 is made up of 32-bit CRC code generated for the user data area 41 and the header area 43. Ciphering in the header appendage circuit 15 may be performed on a synchronization signal, that is a so-called data sync, a header address or CRC.

As an example of ciphering the sector synchronization signal or data sync, if byte patterns allocated to respective bytes of the 4-byte sync area 42 are denoted by A, B, C and D in FIG. 8, the contents of these four bytes may be shifted or rotated on the byte basis using the 2-bit key information. That is, by switching to ABCD, BCDA, CDAB or to DABC for the 2-bit key of 0, 1, 2 or 3, respectively, sector synchronization cannot be achieved failing the key data coincidence, such that regular reproduction cannot be realized. For the byte patterns A to D, character codes of ISO646, for example, may be used.

Figure 9:
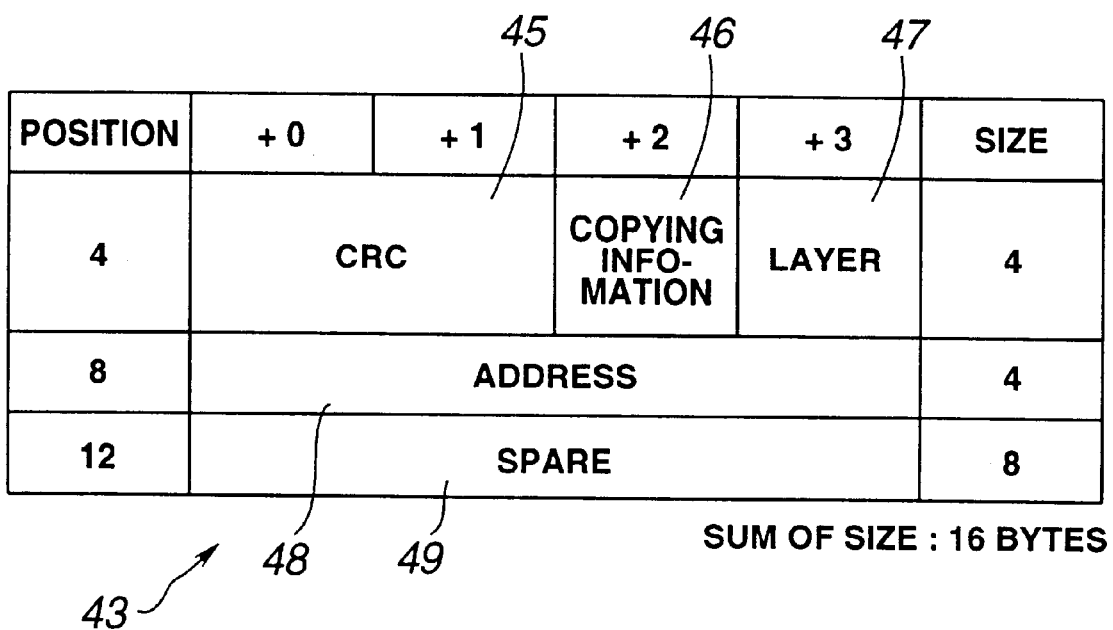
FIG. 9 illustrates an example of a header area in a sector.

In the header region 43, there are formed respective layers for CRC 45, as a so-called redundancy cyclic code, the copying information 46 for copying permission/non-permission, or management of the copying generation, a layer 47 indicating a specified layer of a multi-layered disc, an address 48 and a spare 49, as shown in FIG. 9. Ciphering can be made by bit scrambling, herein bit-based transposition, on 32 bits of the address 48. If $x^{16}+x^{15}+x^{2}+1$ is used as a generating polynominal for the CRC 45, ciphering can also be made by varying 15 bits for $x^{15-}x$ responsive to the key in place of the second term $x^{15}$ and the third term $x^{2}$. Ciphering can also be made by processing 16 bits of the CRC 45 and the key information by arithmetical operations.

The key information may be enumerated by the identification information proper to the medium, the producer identification information, dealer identification information, the identification information proper to the record apparatus, encoder or the medium producing apparatus, the territory information, or the identification information furnished from outside. The above information may be used in combination with one another or with the other information.

Figure 10:
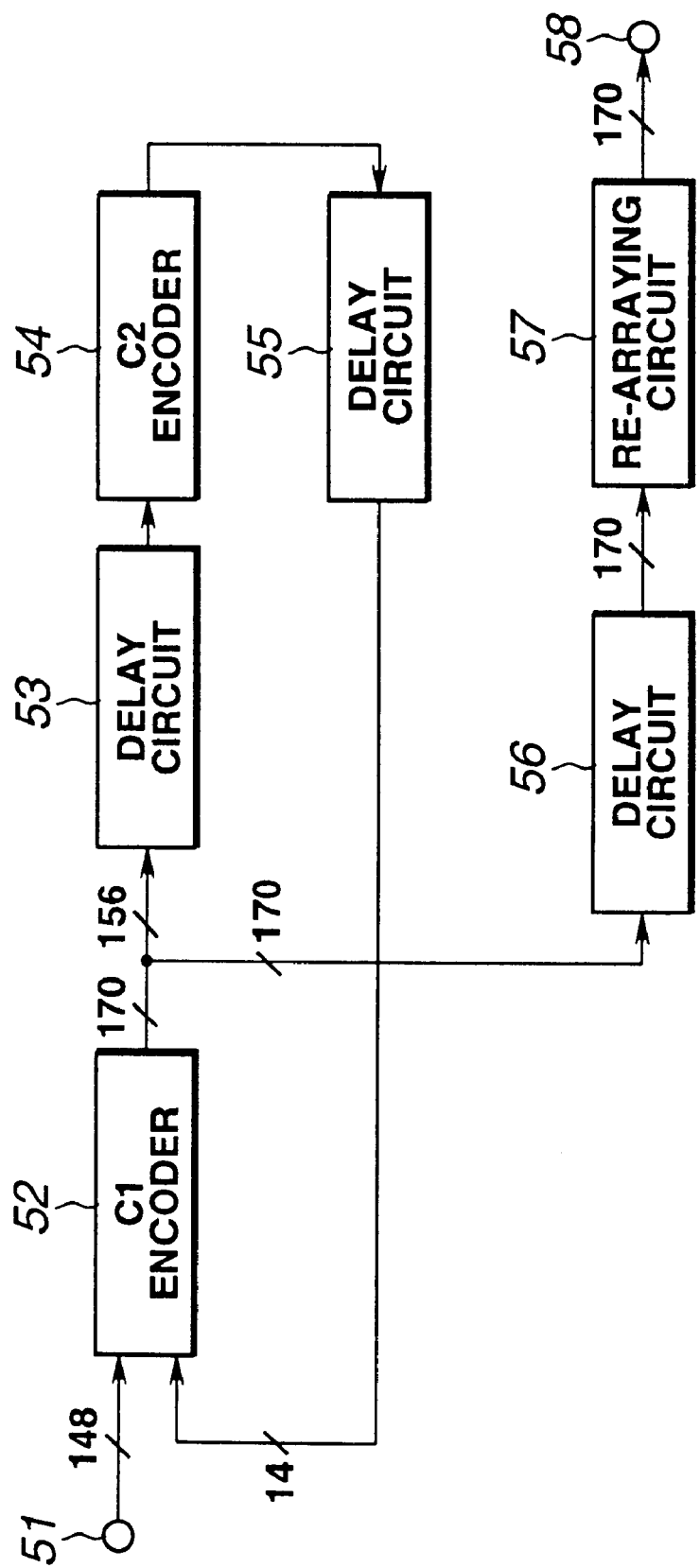
FIG. 10 illustrates a schematic structure of an error correction encoding circuit.
Figure 11:
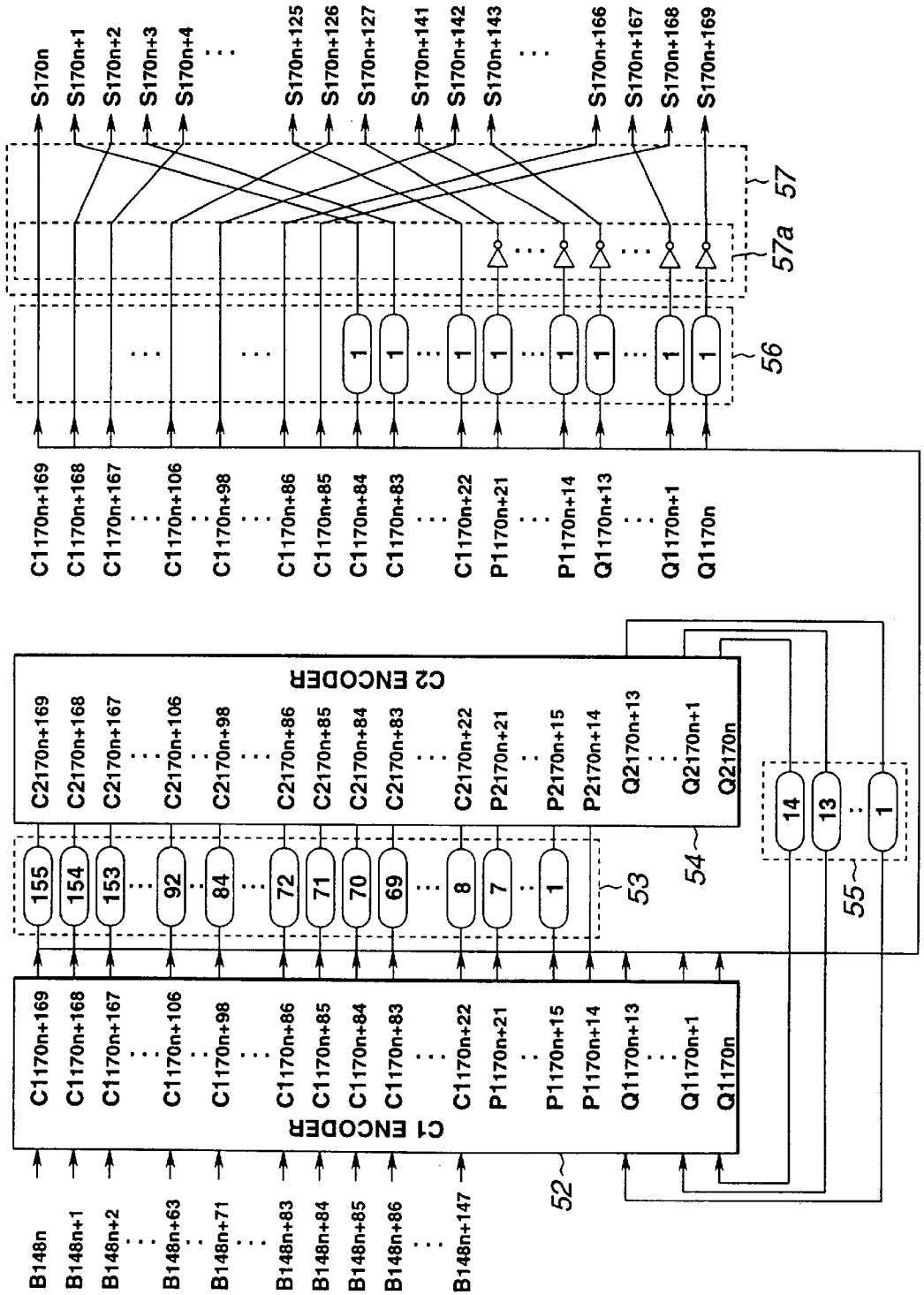
FIG. 11 illustrates a specified structure of an error correction encoding circuit.

FIGS. 10 and 11 illustrate a specified embodiment of the error correction encoding circuit 16.

In FIGS. 10 and 11, data from a header appendage circuit 15 of FIG. 1 is fed via an input terminal 51 to a C1 encoder 52. In the present specified embodiment, each frame of error correction and encoding is made up of 148 byte or 148 symbol data. The digital data at the input terminal 51 are collected every 148 bytes and sent to a C1 encoder 52 as a first encoding unit. In the C1 encoder 52, an 8-byte parity is appended, and the resulting data is sent via a delay circuit 53 for interleaving to a C2 encoder 54 as a second encoding unit. The C2 encoding unit 54 appends to the data a 14-byte Q-parity which is fed back via a delay circuit 55 to the C1 encoder 52. From the C1 encoder 52, 170 bytes containing P and Q parities are taken out and outputted via the delay circuit 56 and a re-arraying circuit 57 having an inverter 57a at an output terminal 58 so as to be sent to a modulation circuit 17 of FIG. 1.

For ciphering in the above-described error correction encoding circuit, it may be contemplated to make selection as to whether or not inverters should be inserted responsive to the ciphering key information every byte of the inverting portion 57a in the re-arraying circuit 57. That is, although 22-byte P- and Q-parities are inverted by the inverters of the inverter portion 57a of the re-arraying circuit 57 in the basic configuration, some of these inverters may be eliminated or a number of inverters may be inserted on the C1 data for inverting output parities.

When performing such data conversion, the probability of impossible error correction is varied depending on the degree of difference from the basic configuration, such that, if such difference is small, the probability of error occurrence at the ultimate reproduced output is only slightly increased, whereas, if there are many differences, error correction becomes difficult on the whole such that reproduction becomes nearly impossible. For example, in the case of the C1 encoder, the distance as an index specifying the error correction capability is 9, so that error detection and correction is possible up to 4 bytes at the maximum and, if there is an erasure point, correction up to 8 bytes at the maximum is possible. Thus, if there are five or more differences, correction becomes always impossible with the C1 code. If there are four differences, a delicate state of correction becoming impossible by at least one other error occurs. As the difference is decreased from three through two to one, the probability of error correction becoming feasible increases in this order. If this is utilized, the state of reproduction in which in case of furnishing audio or video software reproduction is possible to a certain extent but is not impeccable and sometimes perturbed can be crated positively. This can be exploited for informing the user of only the epitome of the software.

In this case, it is possible to use such a method in which the sites of change of the inverters are prescribed at, for example, two sites, a method in which the sites of changes are selected at random depending on the key information and the smallest number of the sites of change are limited to two sites, or a method consisting in the combination of the two methods.

The positions of insertion or modification of the inverters are not limited to those in the re-arraying circuit 57 in FIGS. 10 and 11, but any arbitrary positions upstream or downstream of the C1 encoder 52 or the combinations thereof may also be used. In case there are plural positions, different keys may be used. As for the data conversion, bit addition or the like logical operations may be used in place of using inverters, data may be transposed depending on the key information for ciphering, or data may be replaced depending on the key information for ciphering. Of course, a variety of ciphering techniques, such as conversion by shift registers or by various function processing, can be used alone or in combination.

Figure 12:
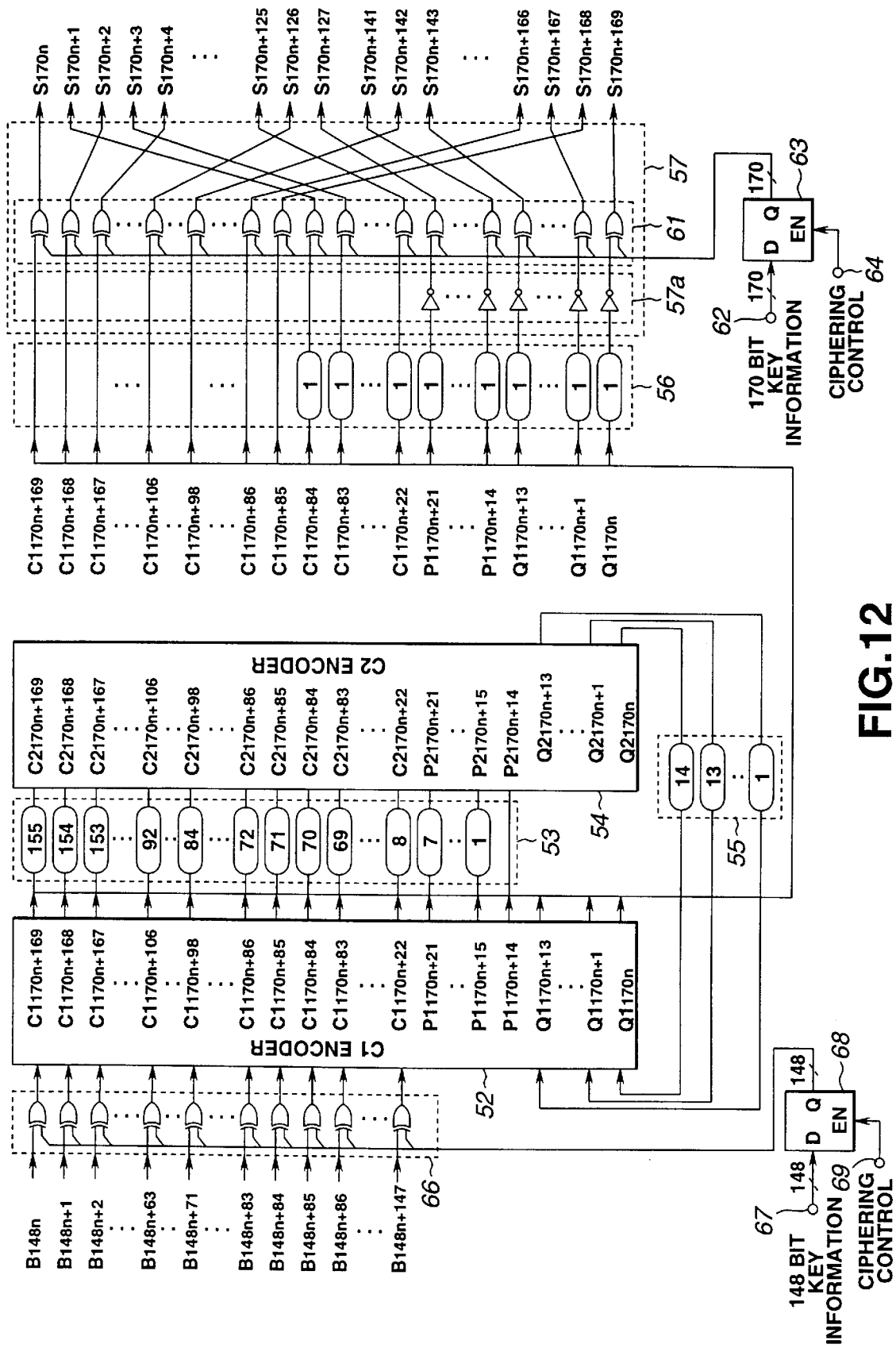
FIG. 12 illustrates another example of an error correction encoding circuit.

FIG. 12 shows another specified embodiment of the error correction encoding circuit 16 in which a set of exclusive-OR (ExOR) circuits 61 is inserted downstream of the inverter 57a within the re-arraying circuit 57 and in which another set of exclusive-OR circuits 61 is inserted upstream of, that is on the input side of the C1 encoder 52.

Specifically, the set of the ExOR circuits 61 perform data conversion of ExOR operation on 170-byte data taken out from the C1 encoder 52 via the delay circuit 56 and the inverter portion 57a of the re-arraying circuit 57, that is on information data $C_{170n+169} \sim C_{170n+22}$ and parity data $P_{170n+21} \sim P_{170n+14}$, $Q_{170n+13} \sim Q_{170n}$, while the set of the ExOR circuits 66 perform data conversion of ExOR operation on 148-byte input data $B_{148n} \sim B_{148n+147}$. The ExOR circuits, used in these set of the ExOR circuits 61, 66, Ex-OR 1-byte or 8-bit input data and pre-set 8 bit data specified by a 1-bit control data. 170 and 148 of these 8-bit ExOR circuits (equivalent to an inverter circuit if the pre-set 8-bit data are all zero) are used for the set of the ExOR circuits 61, 66, respectively.

In FIG. 12, the 170-bit key information is sent to a terminal 62 and routed via a so-called D-latch circuit 63 to each of the 170 ExOR circuits in the set of the ExOR circuits 61. The D-latch circuit 63 is responsive to the 1-bit ciphering control signal supplied to an enabling terminal 64 to switch between sending the 170-bit key information from the terminal 62 directly to the set of the ExOR circuits 61 and setting all of the 170 bits to "0". Of the 170 ExOR circuits of the set of the ExOR circuits 61, the ExOR circuit fed with "0" from the D-latch circuit 63 directly output data from the inverter portion 57a in the re-arraying circuit 57, while the ExOR circuit fed with "1" from the D-latch circuit 63 inverts and outputs data from the inverter portion 57a in the arraying circuit 57. In case of all-zero, data from the inverter portion 57a in the re-arraying circuit 57 is directly outputted. The set of the ExOR circuits 66 is similar to the set of the ExOR circuits 61 except that it includes 148 ExOR circuits and has the key information of 148 bits. Thus, the 148-bit key information supplied to a terminal 67 is sent via a D-latch circuit 68 to each of the set of the ExOR circuits in the set of the ExOR circuits. The D-latch circuit 68 is switched to 148-bit key information or all-zeros by the ciphering control signal of an enabling terminal 69.

In the circuit of FIG. 12, the set of the ExOR circuits 61 perform data conversion of ExOR operation on 170-byte data taken out from the C1 encoder 52 via the delay circuit 56 and the inverter portion 57a of the re-arraying circuit 57, that is on information data $C_{170n+169} \sim C_{170n+22}$ and parity data $P_{170n+21} \sim P_{170n+14}$, $Q_{170n+13} \sim Q_{170n}$. Alternatively, the set of the ExOR circuits 61 may be designed to perform data conversion on 148-byte information data $C_{170n+169} \sim C_{170n+22}$, dependent on the 148-bit key information, without performing data conversion on the parity data.

With the circuit of FIG. 12, the operation and effect similar to those of FIGS. 10 and 11 may be realized. It is also possible to use one of the ExOR circuits 61 and 66 or to use the selection of one or both of the ExOR circuits as the ciphering key.

The key information may be enumerated by the identification information proper to the medium, producer identification information, dealer identification information, identification information proper to the record apparatus, encoder or the medium producing apparatus, territory information, or the identification information furnished from outside. The above information may be used in combination with one another or with the other information.

In place of the ExOR circuits 61 and 66 as the data conversion means, AND, OR, NAND, NOR or inverter circuits may also be used as the above data conversion means. In addition to performing logical processing by the 1-bit key information or the key data on the 8-bit basis, logical processing may also be performed on the 8-bit information data. Alternatively, the AND, OR, ExOR, NAND, NOR or inverter circuits may be used in combination for respective ones of the 8 bits corresponding to 1 word of the information data. In this case, 148×8 bit key data is used for 148-byte data, that is 148×8 bit data. Moreover, if the AND, OR, ExOR, NAND, NOR or inverter circuits are used in combination, these combinations themselves may also be used as the key. Various ciphering techniques, such as conversion by shift registers or various function processing may, of course, be used such that these may also be used in combination.

Although an example of cross-interleaving type error correction code has been explained in the first embodiment, it may also be applied to a product code, as will be explained later as a second embodiment of the present invention.

Figure 13:
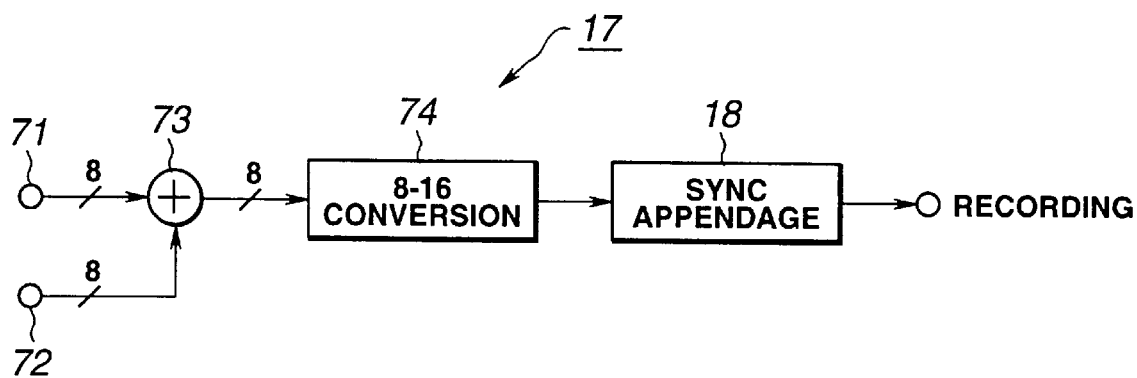
FIG. 13 illustrates an example of ciphering in a modulation circuit.

Referring to FIG. 13, ciphering by the modulation circuit 17 of FIG. 1 is now explained. In this figure, data from the error correction coding circuit 16 is fed every 8 bits (one byte) to a terminal 71, while the 8-bit key information is fed to an input terminal 72. These 8-bit data are fed to an ExOR circuit 73, as an example of the logical processing circuit, for performing an Ex-OR operation. An 8-bit output of the ExOR circuit 73 is sent to a modulator of a pre-set modulation system, such as an 8–16 conversion circuit 74, for conversion to 16 channel bits. An example of the 8–16 conversion system by the 8–16 conversion. circuit 74 is a called EFM plus modulation system.

Although the ciphering employing the 8-bit key information is performed prior to data modulation, the number of bits of the key information is not limited to 8, while the input-output correlation of a conversion table used for 8–16 conversion may be varied responsive to the key information. For the key information, the identification information proper to the record medium as described above may, of course, be employed.

The synchronization appendage circuit 18 is now explained.

The synchronization appendage circuit 18 takes synchronization, using four sorts of synchronization words S0 to S3 shown in FIG. 14, in terms of frames of the 8-to-16 modulation as unit. For example, to 85 data symbols or 1360 channel bits as one frame of the 8-to-16 modulation is added a synchronization word of 32 channel bits, this frame is structured by association with the C1 or C2 code and the synchronization word of a leading frame of the C1 code-string is caused to differ from the synchronization word of another frame for producing the four sorts of the synchronization words S0 to S3. These synchronization words S0 to S3 have respective two synchronization patterns a and b depending on the states of "1" or "0" of the directly previous word, the so-called digital sum or the dc value.

Figure 15:
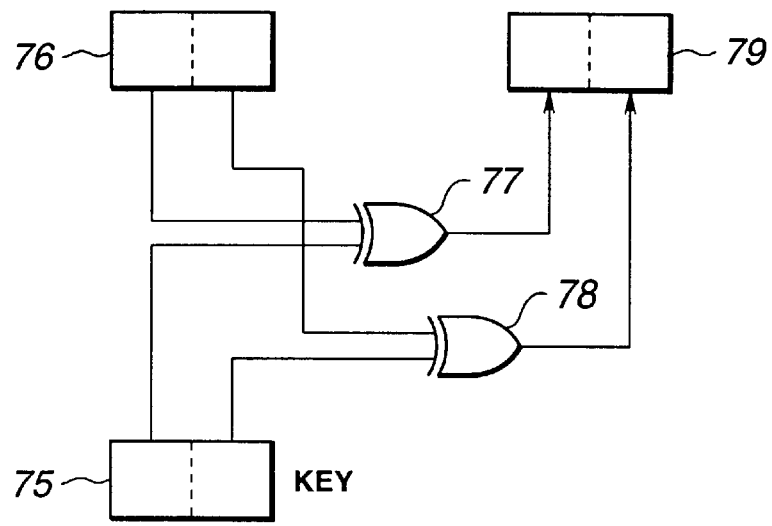
FIG. 15 illustrates an example of ciphering in a sync appending circuit.

Selection of these four synchronization words S0 to S3 can be changed depending on two bits of the key information 75, using the circuit shown for example in FIG. 15, for the purpose of effecting the ciphering. That is, respective bits of two-bit data 76 designating the four synchronization words S0 to S3 and respective bits of the 2-bit key information 75 are ExORed by two ExOR circuits 77, 78 for producing a new synchronization word designating data 79. This modifies the manner of using the synchronization word in the above-described frame structure or the position of using various sorts of the synchronization words in the above-described frame structure for the purpose of effecting the ciphering.

It is also possible to increase the number of sorts of the synchronization word and to determine the manner of taking out the four sorts of the synchronization words from among these synchronization words depending on the ciphering key. The aforementioned identification information proper to the record medium may be used as this key information.

Figure 16:
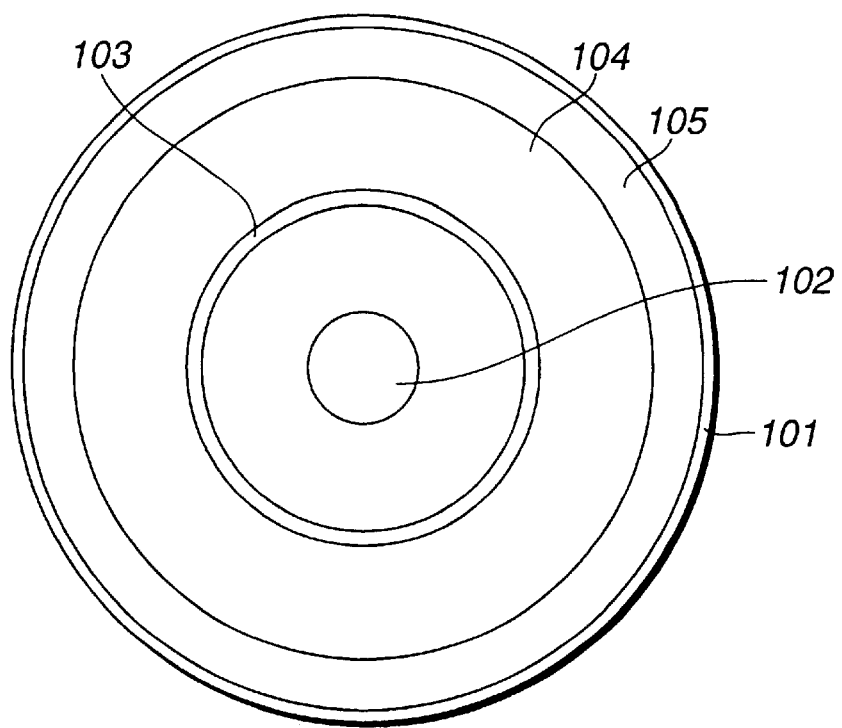
FIG. 16 illustrates an example of a data record medium.

FIG. 16 shows a disc-shaped record medium 101, such as an optical disc, as an example of the record medium. This disc-shaped record medium 101 has a center aperture 102 and has formed therein a lead-in area 103, as a table-of-contents (TOC) area or a program management area, a program area 104 for recording program data and a program end area or a lead-out area 105, looking from the inner rim towards the outer rim thereof. In an optical disc for reproducing audio signals or video signals, audio or video data is recorded in the program area and the time information for the audio or video data are managed by the lead-in area 103.

As part of the key information, the identification information written in an area other than the program area as the data recording area may be used as part of the key information. Specifically, the identification information, including the identification information, such as the production number proper to the record medium, identification information for the producer, identification information for the dealer, identification information proper to the recording device or the encoder or identification information proper to the device for producing the record medium, such as a cutting machine or a stamper, may be written the lead-in area 103 as the TOC area or in the lead-out area 105. A signal obtained on ciphering in at least one and preferably two of the above-mentioned six circuits 13 to 18 is recorded in the program area 104 as the data recording area. For reproduction, the above identification information may be used for deciphering. The identification information may also be written physically or chemically inwardly of the lead-in area 103 and read out during reproduction so as to be used as the key information for decoding.

Figure 17:
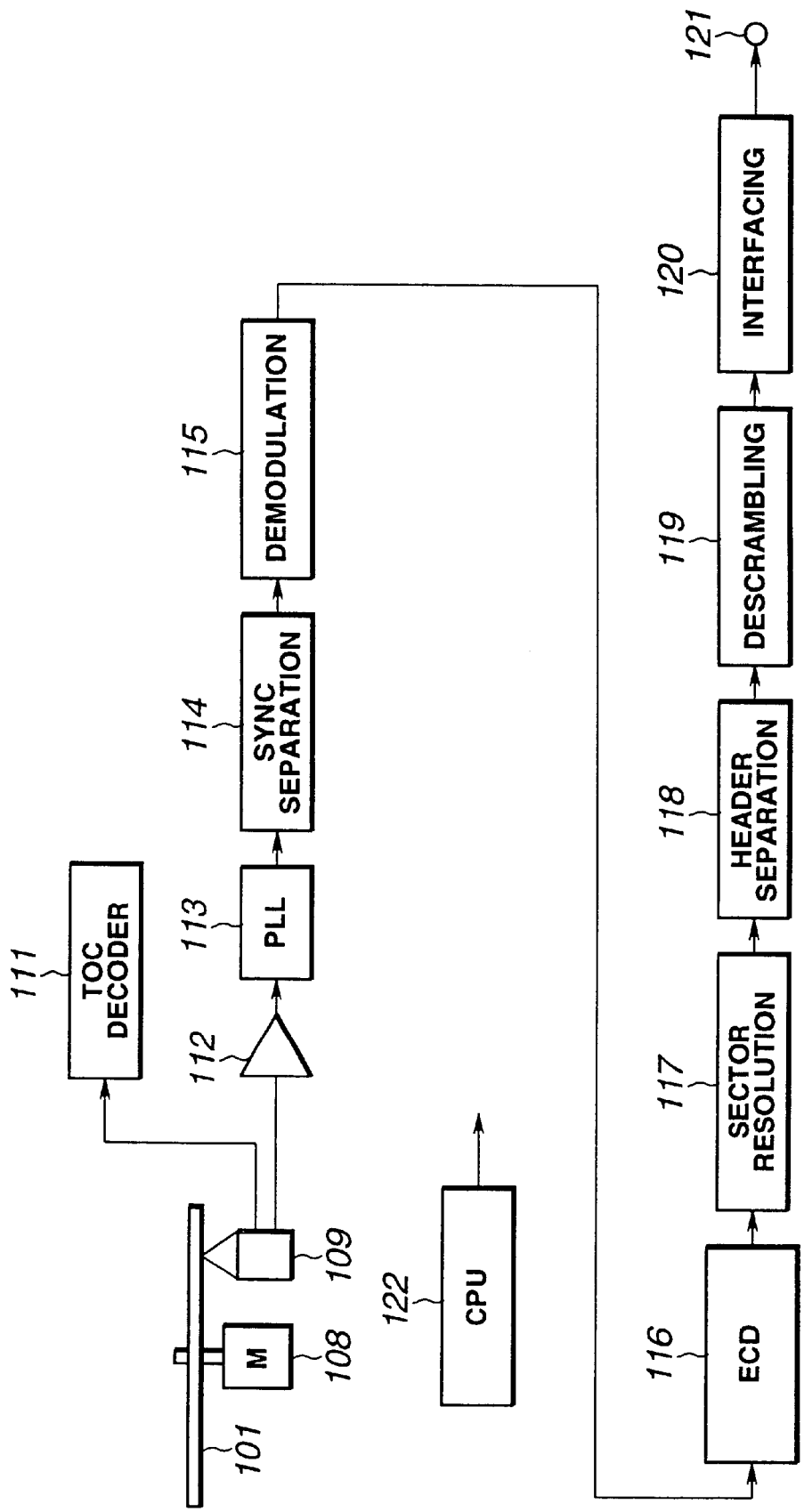
FIG. 17 is a block diagram showing a schematic structure of a first embodiment of a data reproducing apparatus according to the present invention.

Referring to FIG. 17, preferred embodiments of the data reproducing method and the data reproducing apparatus according to the present invention will be explained.

In FIG. 17, the disc-shaped record medium 101, as an example of the record medium, is run in rotation by a spindle motor 108 so that the recording contents thereof are read out by a reproducing head device 109, such as an optical pickup.

The digital signals read out by the reproducing head device 109 is sent to a TOC decoder 111 and to an amplifier 112. From the TOC decoder 111, the identification information, including the identification information, such as the production number proper to the record medium, identification information for the producer, identification information for the dealer, identification information proper to the recording device or the encoder or identification information proper to the device for producing the record medium, such as a cutting machine or a stamper, are read out so as to be used as at least a portion of the key information for decoding the ciphering. The identification information proper to the reproducing device or the identification information from outside may be outputted from a CPU 122 in the reproducing device so as to be used as at least a portion of the key information. The identification information from outside includes the identification information received via the communication network or transmission path and the identification information obtained on reading a so-called IC card, ROM card, a magnetic card or an optical card.

The digital signal taken out from the reproducing head device 109 via amplifier 112 and a phase-locked loop (PLL) circuit 113 is sent to a synchronization separation circuit 114 for separation of the synchronization signal appended by synchronization appendage circuit 18 of FIG. 1. The digital signal from the synchronization separation circuit 114 is sent to a demodulation circuit 115 for performing an operation which is the reverse of the modulation performed by the modulation circuit 17 of FIG. 1. Specifically such operation is converting 16 channel bits into 8 bit data. The digital data from the demodulation circuit 115 is sent to an error correction decoding circuit 116 for performing decoding as a reverse operation of the encoding performed by the error correction encoding circuit 16 of FIG. 1. The decoded data is resolved into sectors by a sector resolution circuit 117 and a header at the leading end of each sector is separated by the header separation circuit 118. The header resolution circuit 117 and the header separation circuit 118 are counterpart devices of the sector forming circuit 13 and the header appendage circuit 15 of FIG. 1, respectively. A descrambling circuit 119 then performs descrambling as a reverse operation of the scrambling performed by the scrambling circuit 14 of FIG. 1 so that reproduced data is outputted via an interfacing circuit 120 at an output terminal 121.

It should be noted that ciphering has been performed during recording in at least one of the sector forming circuit 13, scrambling circuit 14, header appendage circuit 15, error correction encoding circuit 16, modulation circuit 17 and the synchronization appendage circuit 18, such that a deciphering operation is required in the reproducing side circuits 114 to 119 as counterpart devices of the ciphering circuits. That is, if ciphering is performed by the sector forming circuit 13 of FIG. 1, it is necessary for the sector resolution circuit 117 to perform ciphering using the key information used for ciphering. Similarly, the deciphering by the descrambling circuit 119, by the header separation circuit 118, by the error correction decoding circuit 116, by the demodulation circuit 115 and by the synchronization separation circuit 114 become necessary in association with the ciphering by the scrambling circuit 14, header appendage circuit 15, error correction encoding circuit 16, modulation circuit 17 and by the synchronization appendage circuit 18 of FIG. 1, respectively.

The deciphering by the synchronization separation circuit 114 is performed by detecting the manner of using a plurality of, for example, four, different sorts of the synchronization words or the position of use of the various synchronization words in a frame structure, modified in accordance with the key information for ciphering, as explained with reference to FIGS. 14 and 15.

Figure 18:
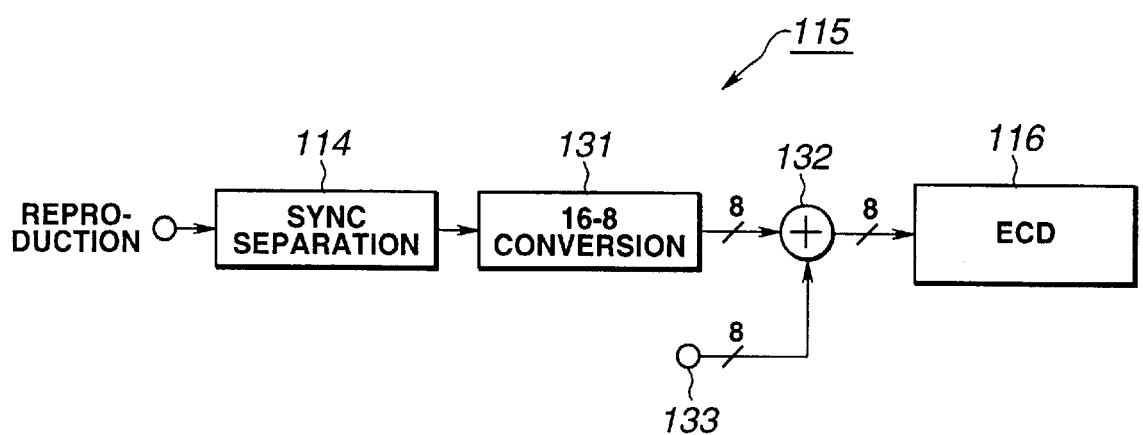
FIG. 18 illustrates an example of deciphering by a demodulation circuit.

In the deciphering operation by the demodulation circuit 115, the 8-bit data, sent from the synchronization separation circuit 114 to a 16-to-8 conversion circuit 131 so as to be converted from the 16 channel bits, are sent to an ExOR circuit 132, as a counterpart circuit of the ExOR circuit 73 of FIG. 13, so as to be Ex-ORed with the 8-bit key information from a terminal 133, for restoring data corresponding to the 8-bit data supplied to the input terminal 71 of FIG. 13, as shown in FIG. 18. The restored data is sent to the error correction decoding circuit 116.

Figure 19:
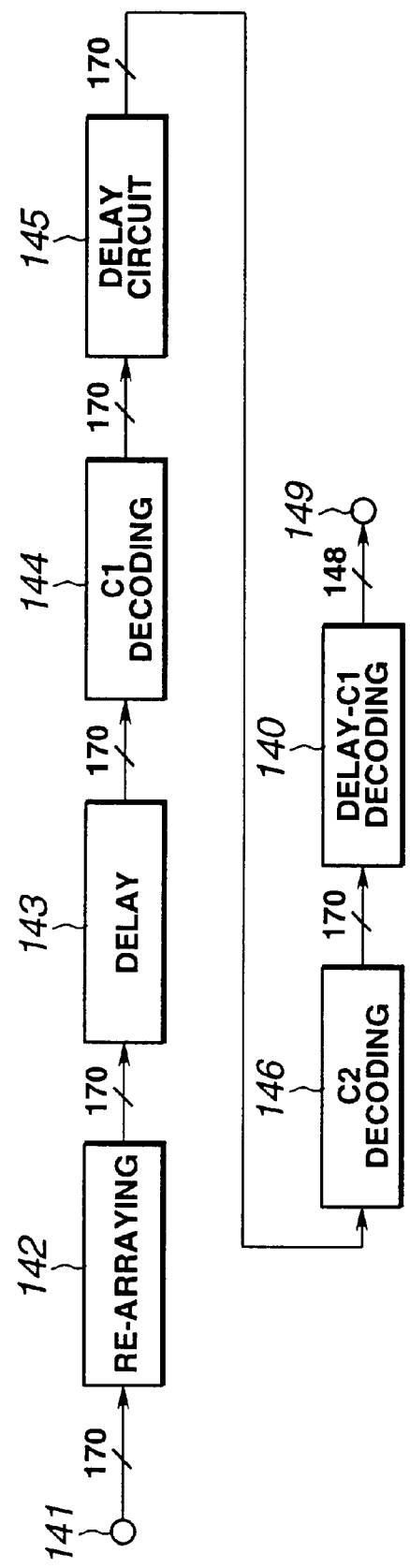
FIG. 19 illustrates a schematic structure of an example of an error correction decoding circuit.
Figure 20:
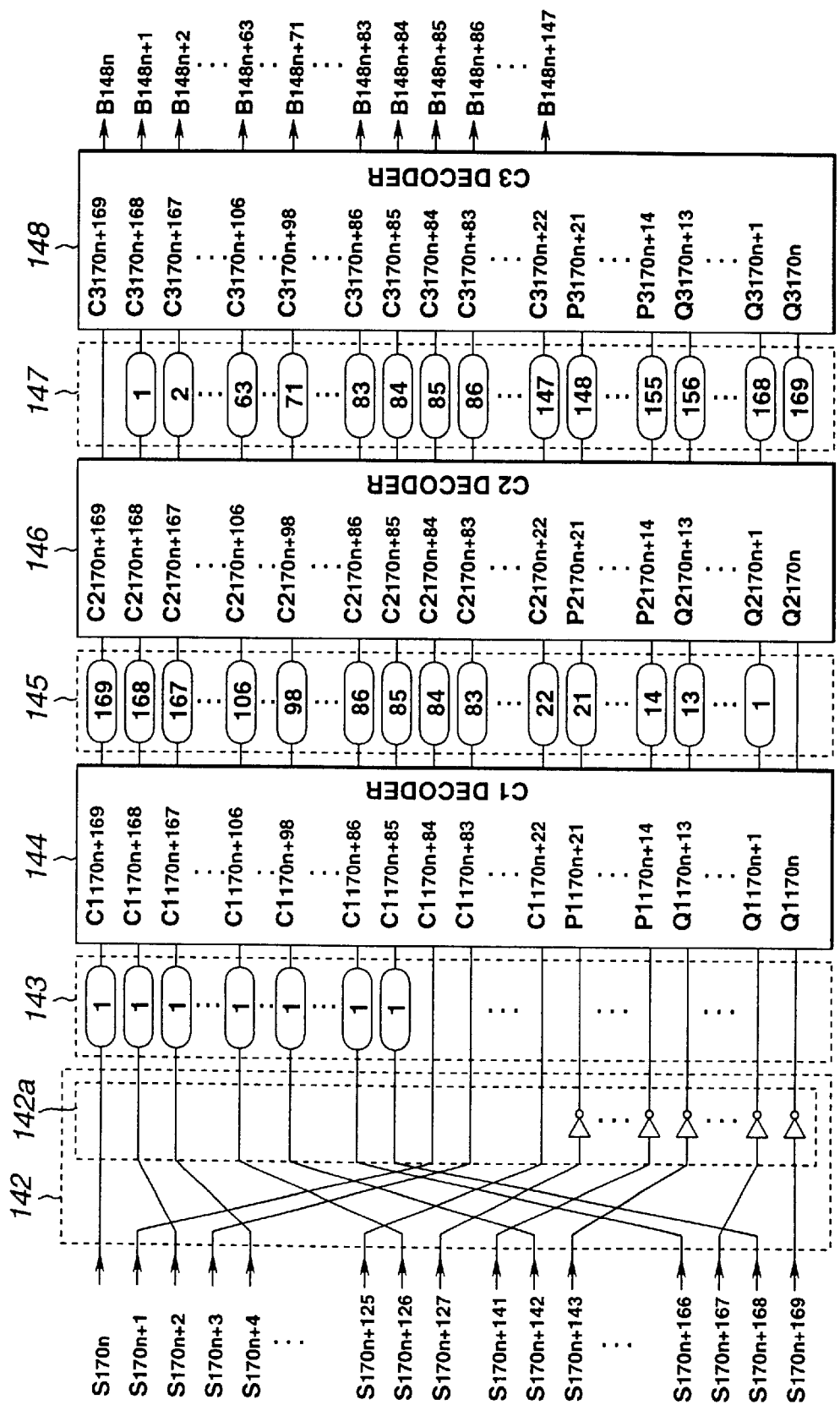
FIG. 20 illustrates a specified structure of an example of an error correction decoding circuit.

The error correction decoding circuit 116 performs a reverse operation of the error correction encoding shown in FIGS. 10 and 11 by the constitution of FIGS. 19 and 20.

Referring to FIGS. 19 and 20, demodulated data from the demodulation circuit 115 are sent, in terms of 170 bytes or 170 symbols as units, via a re-arraying circuit 142 having an inverter 142a and via a delay circuit 143, to a C1 decoder 144 as a first decoder. Of the 170 bytes of data supplied to this C1 decoder 144, 22 bytes are P parity data and Q parity data. The C1 decoder 144 performs decoding using these parity data. The C1 parity data outputs 170 byte data via a delay circuit 145 to a C2 decoder 146 as a second decoder where error correction and decoding are performed using these parity data. Output data of the C2 decoder 146 is sent to a delay-C1 decoding circuit 140 of FIG. 19. This circuit is similar to the delay circuit 143 and the C1 decoder 144 and repeatedly performs the operation similar to that performed by the delay circuit 143 and the C1 decoder 144 for performing error correction and decoding. In the embodiment of FIG. 20, delay-C1 decoding circuit 140 is shown as a delay circuit 147 and a C3 decoder 148 as a third decoder. The delay circuit 147 and the C3 decoder 148 or the delay-C1 decoding circuit 140 perform ultimate error correction and decoding so that 148-byte data devoid of parity is outputted at an output terminal 149. The 148-byte data corresponds to the 148-byte data entering the C1 decoder 52 of FIG. 11.

If ciphering has been performed in the inverter portion 57a of the re-arraying circuit 57 of the error correction encoding circuit of FIGS. 10 and 11, it is necessary for the inverter portion 142a in the re-arraying circuit 142 of the error correction and decoding circuit of FIGS. 19 and 20 to perform corresponding deciphering. It is of course necessary to perform deciphering as a reverse operation of the various sorts of ciphering explained with reference to FIGS. 10 and 11.

Figure 21:
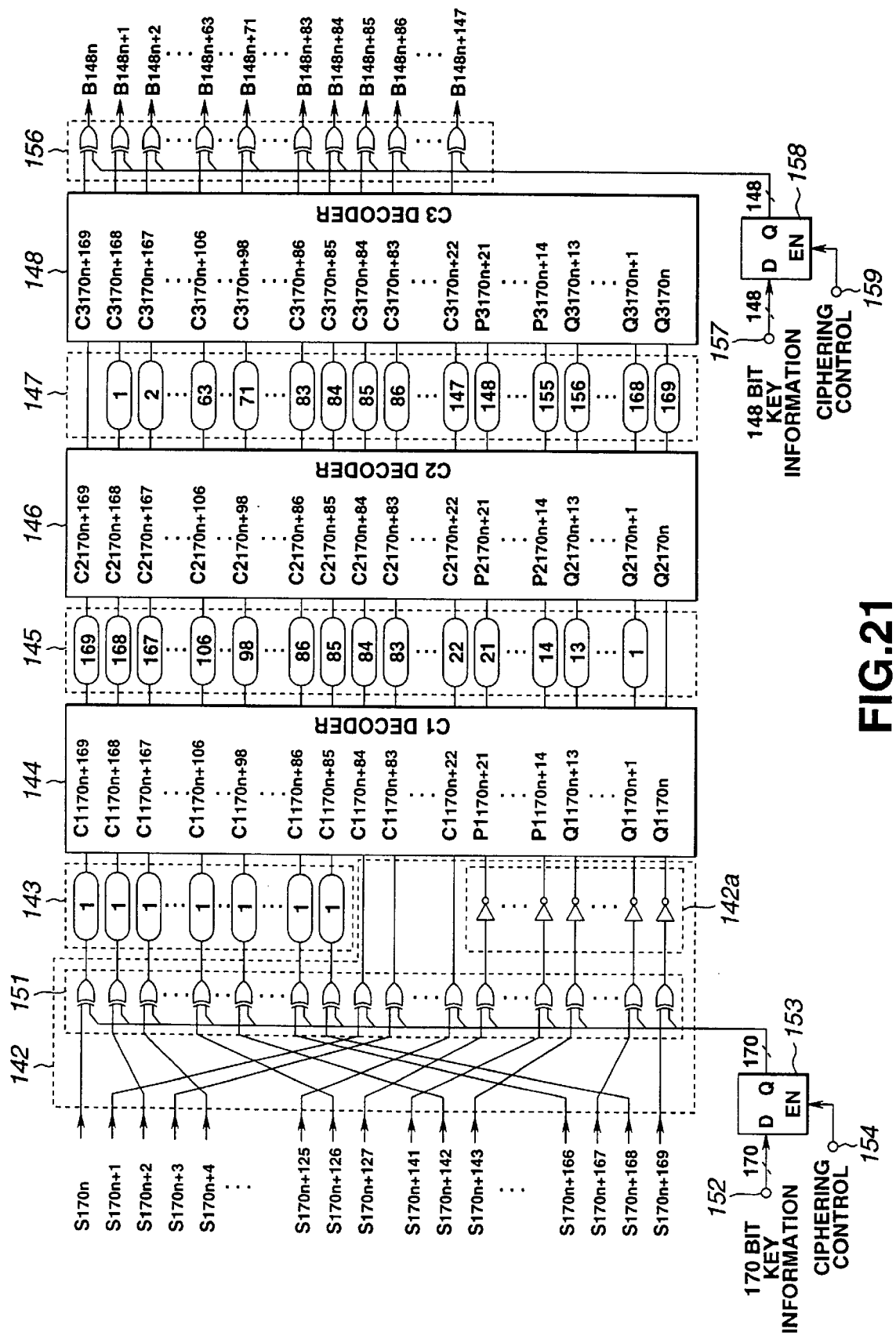
FIG. 21 illustrates another example of an error correction decoding circuit.

FIG. 21 shows an illustrative structure of the error correction decoding circuit as a counterpart of the illustrative structure of the error correction encoding circuit shown in FIG. 12.

Referring to FIG. 21, a set of ExOR circuits 151 are inserted on an input side of the inverter portion 142a of the re-arraying circuit 142 and on an input side of the delay circuit 143, in association with the set of ExOR circuits 61 inserted on the output side of the inverter portion 57a of the re-arraying circuit 57 of FIG. 12, while a set of ExOR circuits 156 are inserted on the output side of the C1 decoder 148 in association with the ExOR circuits 66 inserted on the input side of the C1 encoder 52 of FIG. 12.

These Ex-OR circuit sets 151, 156 are configured for data conversion for decoding the data conversion performed by the ExOR circuits sets 61, 66 of FIG. 12. Of these, the set of the ExOR circuits 151 are made up of, for example, 170 8-bit ExOR circuits, while the set of the ExOR circuits 156 are made up of, for example, 148 8-bit ExOR circuits. If data conversion responsive to the key information has been done for the 148-byte information data excluding the parity data by the ExOR circuits 61 of the recording side error correction encoding circuit of FIG. 12, the set of the ExOR circuits 151 are naturally constituted by 148 8-bit ExOR circuits.

To a terminal 152 of FIG. 21 is supplied the 170-bit key information corresponding to the key information supplied to the terminal 62 of FIG. 12. The key information is supplied via a D-latch circuit 153 to each of 170 ExOR circuits within the set of the ExOR circuits 151. The D-latch circuit 153 is switched, responsive to the 1-bit ciphering control signal supplied to an enabling terminal 154, between sending the 170-bit key information from the terminal 152 directly to the set of ExOR circuits 151, and setting the 170 bits to "0", in their entirety (all-zero). On the other hand, the set of ExOR circuits 156 are similar to the set of the ExOR circuits 151 except that the set of ExOR circuits 156 has 148 ExOR circuits 151 and has the 148-bit key information similarly to the key information supplied to the terminal 12 of FIG. 12. The 148-bit key information supplied to a terminal 157 is sent via a latch circuit 158 to each of the 148 ExOR circuits 156 via D-latch circuit 158. The D-latch circuit 158, in turn, is switched responsive to the ciphering control signal from an enabling terminal 159 between the 148-bit key information and all-zero.

By employing the ExOR circuits or the inverter of the error correction circuit, it becomes possible to realize simple and significant ciphering. Moreover, by controlling the number of the inverters, normally non-reproducible data of the ciphering level or data becoming non-reproducible in a worsened error state can be coped with responsive to the demand for security level. That is, by controlling the number of the inverters or the ExOR circuits, control can be done in such a manner that reproduction becomes possible and impossible for the better and worse error states, respectively. Moreover, the reproducible state that cannot be recovered by error correction by itself can also be produced. As for the ciphering key, the number of bits can even reach 100 or more per ciphering site as in the above illustrated embodiment and hence ciphering with the large number of bits of the key becomes possible thus improving data security. Moreover, by implementing the error correction encoding circuit and the error correction decoding circuit within an LSI or IC chip hardware, accessing to the record medium can be made more difficult from the users in general, thus again raising data security.

The sector resolution circuit 117 performs so-called deinterleaving, that is a reverse operation to the even or odd interleaving if ciphering by such even or odd byte interleaving has been done for recording by the sector forming circuit 13, as explained with reference to FIGS. 2 and 3.

The header separation circuit 118 performs corresponding deciphering if the ciphering explained with reference to FIGS. 7 to 9, that is data sync byte pattern transposition representing sector synchronization, address change or CRC change, has been done during recording by the header appendage circuit 15.

Figure 22:
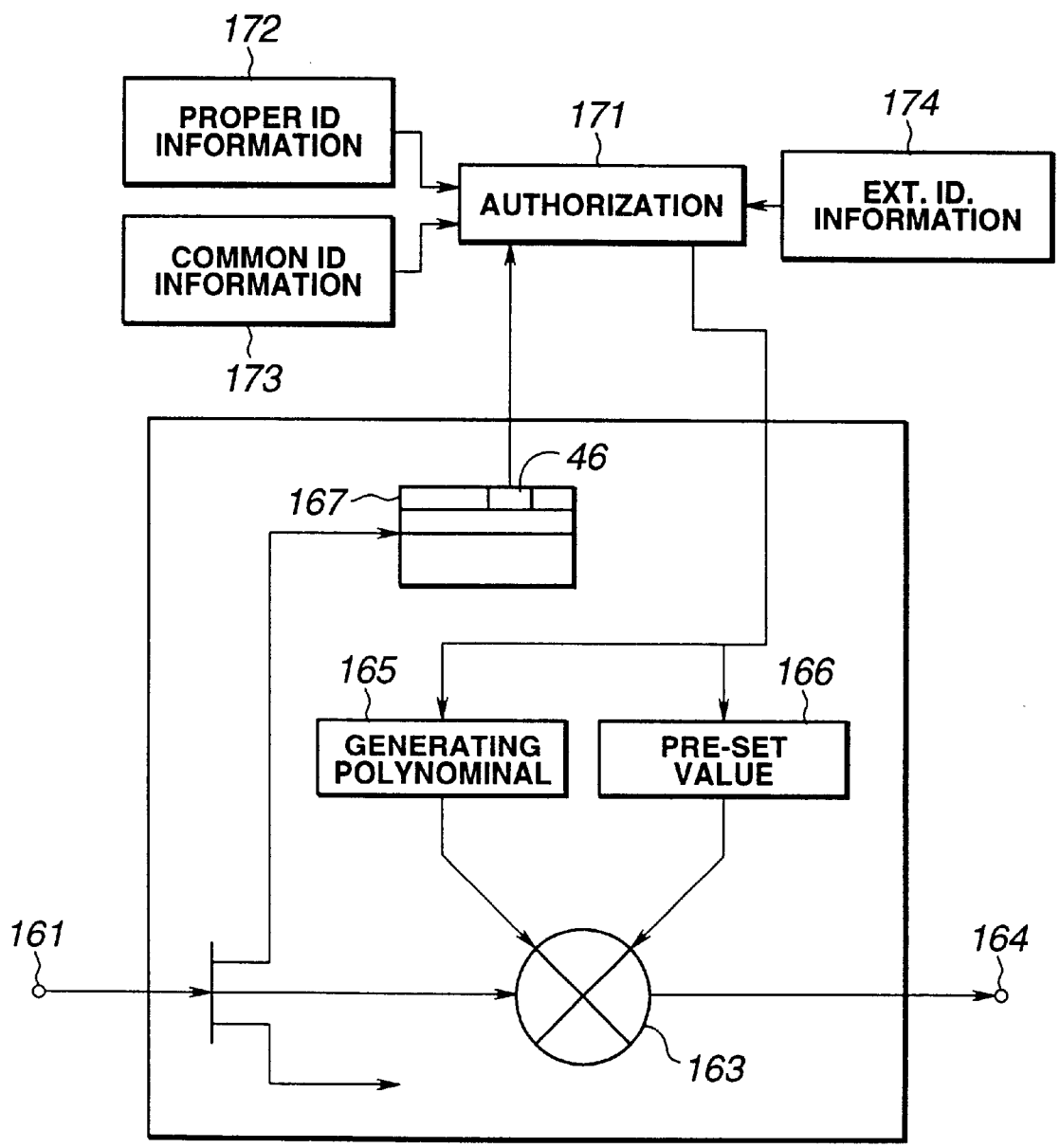
FIG. 22 illustrates an example of a descrambling circuit.

FIG. 22 shows an illustrative embodiment of the descrambling circuit 119. To a terminal 161 is fed digital data from the header separation circuit 118 of FIG. 17. Digital data from the terminal 161 is descrambled by a scrambler 163 configured as shown in FIG. 4 so as to be taken out at an output terminal 164. Deciphering can be performed by changing a polynomial 165 and a pre-set value or the initial value 166 as explained with reference to FIG. 4 for the scrambler 163 in dependence upon the ciphering key information from an authorization mechanism 171. The authorization mechanism 171 generates the ciphering key information, depending upon the contents of the copying information 46 of the header information 167, identification information proper to the record medium or to the reproducing apparatus, the common identification information 173 proper to the producer or the dealer or the external identification information 174 supplied from outside for controlling the generating polynominal 165 or the pre-set value 166 depending on the key information.

The information as to in which of these circuits 114 to 119 the deciphering is required may prove to be the key information for ciphering, as discussed previously. Moreover, the ciphering key information may be switched in a pre-set period, for example, every sector. The extent of ease or difficulty in ciphering is increased by using whether or not switching is to be made, or the switching period, as the key.

By combining the producer identification information, dealer identification information or device identification information with the copying protection information or charging information, set separately, as described above, for ciphering data, and recording the ciphered data, prevention of copying, pirate edition or illicit use can be realized on the physical format level. In addition, the information concerning the data security function, copying permit/non-permit information or the charging/charge-free information is implemented on a record medium or in a physical format of the recording/reproducing system.

That is, by pre-recording the security/charging information on the record medium, and by combining it with data ciphering using the recording/non-recording information for the record medium, copying prevention and prevention of illicit use can be realized by a simplified structure. Decoding can be made difficult by latent incorporation in the physical format. The structure is safe against dump copying since it remains in the ciphered state. The structure can be varied on the sector basis, on the file basis, on the zone basis or on the layer basis. Moreover, key control can be done by communication, IC card or by a remote controller. Hysteresis can also be left against pirating.

The second embodiment of the present invention is now explained.

The second embodiment is a partial modification of the first embodiment described above. The overall structure is as shown in FIG. 1. Only the modified portions of the circuits 13 to 18 of the configuration of FIG. 1 are now explained.

The sector forming circuit 13 of FIG. 1 can be configured as in the first embodiment described above. However, the scrambling circuit 14 is configured as shown in FIG. 23.

Figure 23:
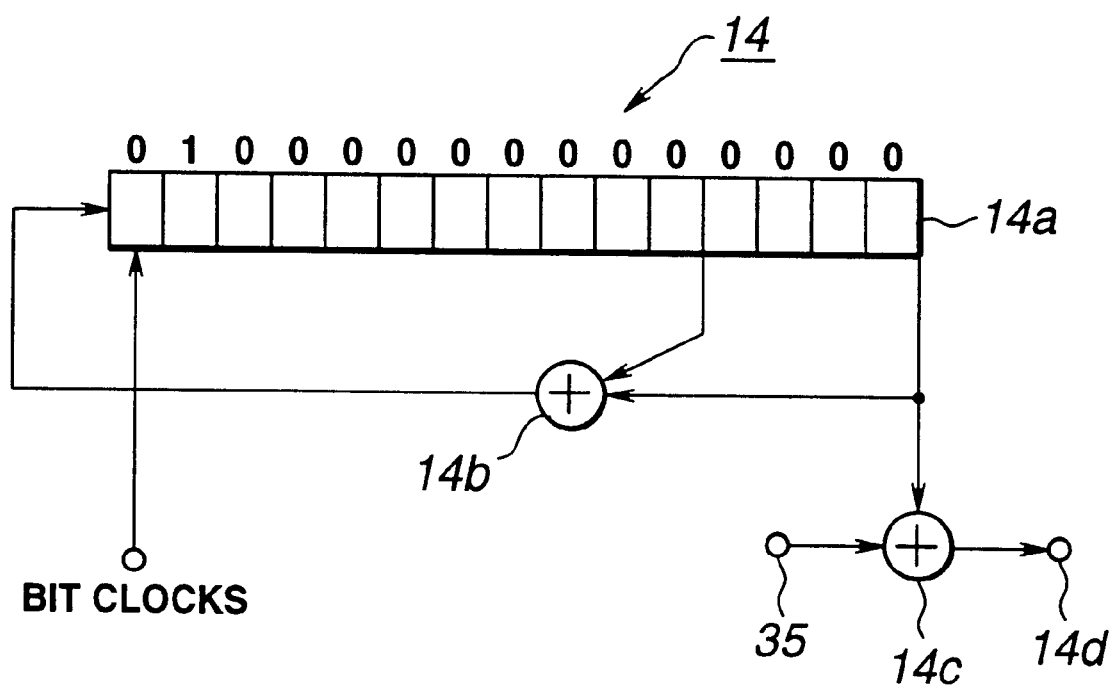
FIG. 23 illustrates another example of a scrambler.

In the scrambling circuit 14, shown in FIG. 23, data from the sector forming circuit 13 of FIG. 1 is supplied in a sequence in which the least significant bit (LSB) comes temporally first, that is in the LSB first order, to the data input terminal 35. A 15-bit shift register 14a for scrambling is configured so that feedback by the generating polynominal $x^{15}+x^4+1$ will be applied using an exclusive-OR (ExOR) circuit 14b, while a pre-set value or an initial value as shown in FIG. 24 is set in the 15-bit shift register 14a. The selection numbers of the pre-set values shown in FIG. 24 are selected so that the pre-set values can be switched on the sector basis in association with, for example, the values of the lower 4 bits of the sector address. Output data of the shift register 14a and input data from the terminal 35 are ExORed by the ExOR circuit 14c, an output of wich is outputted at an output terminal 14d so as to be sent to the header appendage circuit 15 of FIG. 1.

The pre-set value (initial value) can be varied depending on the key information such as the pre-set identification number. That is, the pre-set values of the 16-byte identification information of the pre-set value table of FIG. 24 can be logically. processed with respective byte values of the 16-byte identification information. The identification information in this case may include the identification information such as the production number proper to the record medium, identification information for the producer, identification information for the dealer, identification information proper to the recording device or the encoder or identification information proper to the device for producing the record medium, territory information, identification information supplied from outside, alone or in combination. The above information of various sorts may also be used in combination with other sorts of the information. The logical processing includes exclusive OR (ExOR), logical product (AND), logical sum (OR) or shifting.

Figure 25:
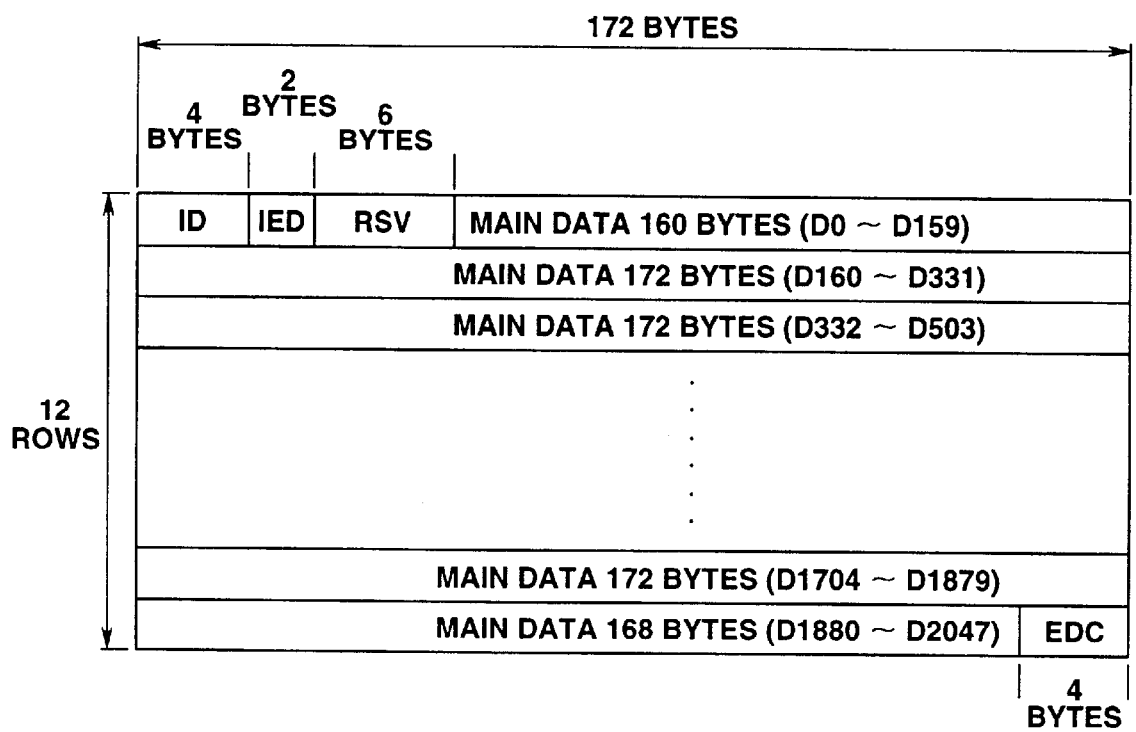
FIG. 25 illustrates an example of a header area in a sector in a sector format of FIG. 25.

The sector format for the second embodiment may be configured as shown for example in FIG. 25.

As shown in FIG. 25, each sector is made up of 12 rows each being of 172 bytes, totaling at 2064 bytes, of which 2048 bytes represent main data. At a leading position of the first one of the 12 rows are arrayed a 4-byte identification data (ID), a 2-byte ID error detection code (IED) and 6-byte reserve data (RSV), in this order. At a terminal position of the last row is arrayed a 4-byte error detection code (EDC).

Figure 26:
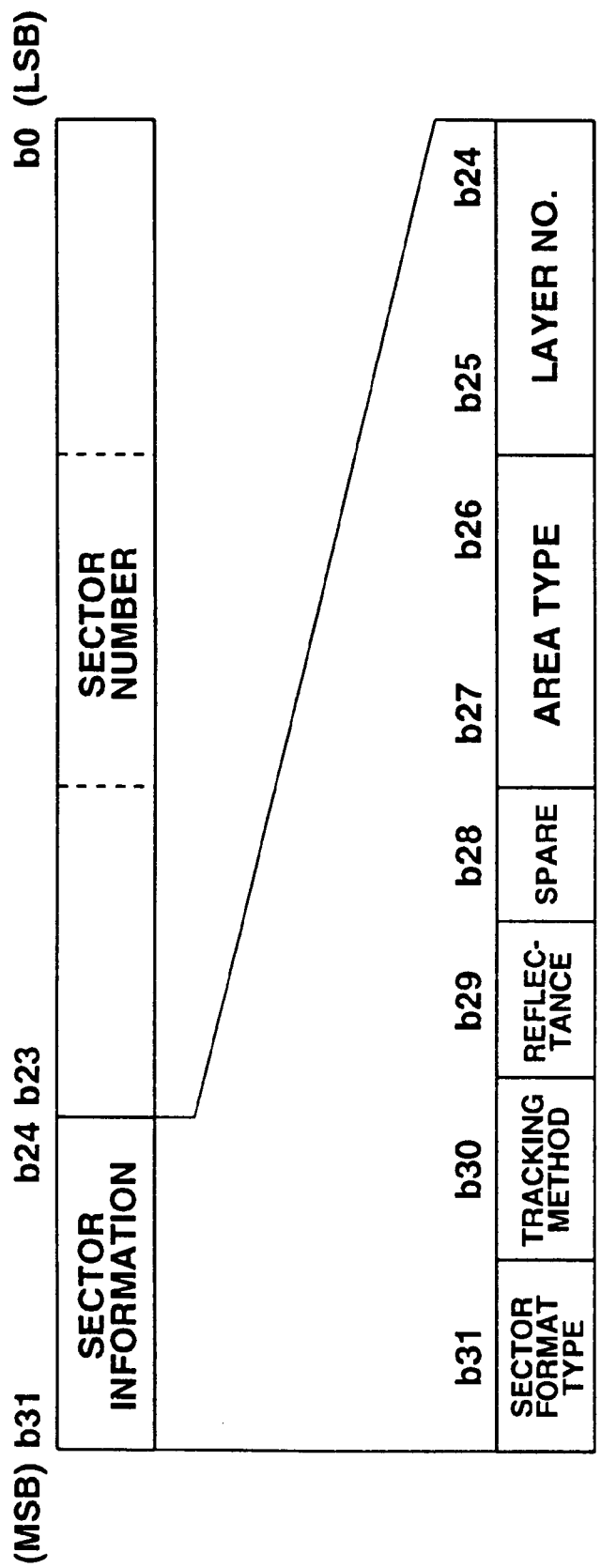
FIG. 26 illustrates an example of a header area in a sector in the sector format of FIG. 25.

As shown in FIG. 26, the 4-bytes of the identification data (ID) are made up of the first byte (bits b31 to b24) formed by the sector information and the remaining three bytes (bits b23 to b0) formed by the sector numbers. The sector information is made up of a 1 bit of the sector format type, a 1 bit of the tracking method, a 1 bit of reflectance, a 1 bit of the spare information, 2 bits of the area type and 2 bits of the layer number.

The header appendage circuit 15 of FIG. 1 performs transposition, that is bit-based scrambling, on the 14 bits of the sector number in the identification data (ID) in the sector format, responsive to the key information, for effecting the ciphering. In addition, the generating polynominal of the 2-byte ID error detection code (IED) or the generating polynominal of the 4-byte error detection code (EDC) can be modified depending on the key information or logically processed with the key information for effecting the ciphering.

Figure 27:
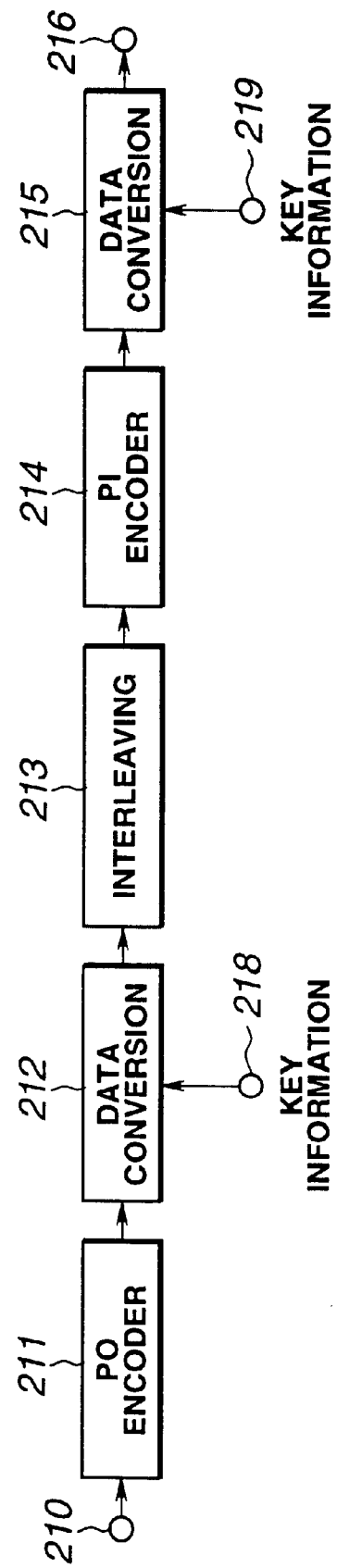
FIG. 27 is a block diagram showing another example of an error correction encoding circuit.
Figure 28:
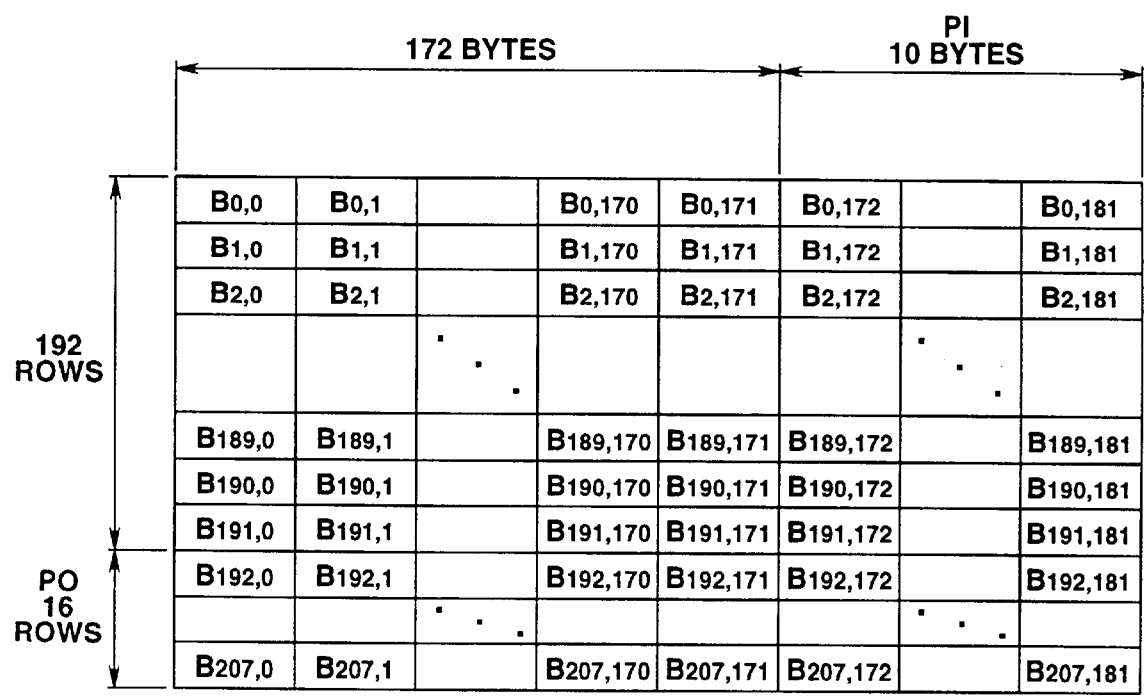
FIG. 28 illustrates a product code as a specified example of the error correction code.

The error encoding correction circuit 16 of FIG. 1 may be configured as shown in FIG. 27. For encoding, product code or the block code as shown in FIG. 28 is used.

Referring to FIG. 27, data from the header appendage circuit 15 shown in FIG. 1 is supplied to an input terminal 210. This input data is supplied to a PO encoder 211 as a first encoding unit. Input data to the PO encoder 211 is 172 bytes×192 rows, or $B_{0,0}$ to $B_{191,172}$. The PO encoder 211 appends an RS outer code (PO) of RS (208,192,17) as 16-byte Reed Solomon code (RS code) to each of 192 bytes of each of 172 columns, as shown in FIG. 28. Output data of the PO encoder 211 are sent via the data conversion circuit for ciphering 212 as described above to an interleaving circuit 213 to from interleaved data which is sent to a PI encoder 214. The PI encoder 214 appends an RS inner code (PI) of RS (182,172,11) (RS code) to each row of 172 bytes of the 172 bytes×208 rows. Thus the PI encoder 214 outputs data of 182 bytes×208 rows. This output data is outputted at an output terminal 216 via a data conversion circuit 215 for ciphering as described above.

Since the PO encoder 211 appends the 16-byte PO parity to the 192-byte input data for each column to output 208-byte data, the data conversion circuit 212 performs data conversion as described above on the 16-byte parity or 208-byte data in their entirety for effecting the ciphering. This data conversion may be made responsive to the key information supplied via a terminal 218. Since the data conversion circuit 215 appends 10-byte PI parity to 172-byte data of each row for outputting 182-byte data, the data conversion circuit 215 can perform ciphering by effecting data conversion on the 10-byte data or on the 182-byte data in their entirety. This data conversion can be performed responsive to the key information supplied via the terminal 219 as described previously.

The above data conversion may be performed by arranging an inverter at a pre-set position, by selectively inverting data by the set of the ExOR circuits responsive to the key information or by using the AND, OR or NAND circuits. In addition to the logical processing on the 8-bit information data by the 1-bit key information data or by key data, logical processing may be performed on the 8-bit information data by the 8-bit key information data, or the AND, OR, ExOR, NAND, NOR or inverter circuits may be used in combination for each of 8 bits making up a word of the information data. Of course, a variety of ciphering techniques, such as conversion by shift registers or function processing may be applied alone or in combination. If the AND, OR, ExOR, NAND, NOR or inverter circuits are used in combination, the combination itself may be used as the key. Moreover, in addition to the logical precessing, transposition of changing data positions or substitution of substituting data values may also be used for data conversion. Of course, a variety of ciphering techniques, such as conversion by shift registers or function processing, may be applied alone or in combination.

Figure 29:
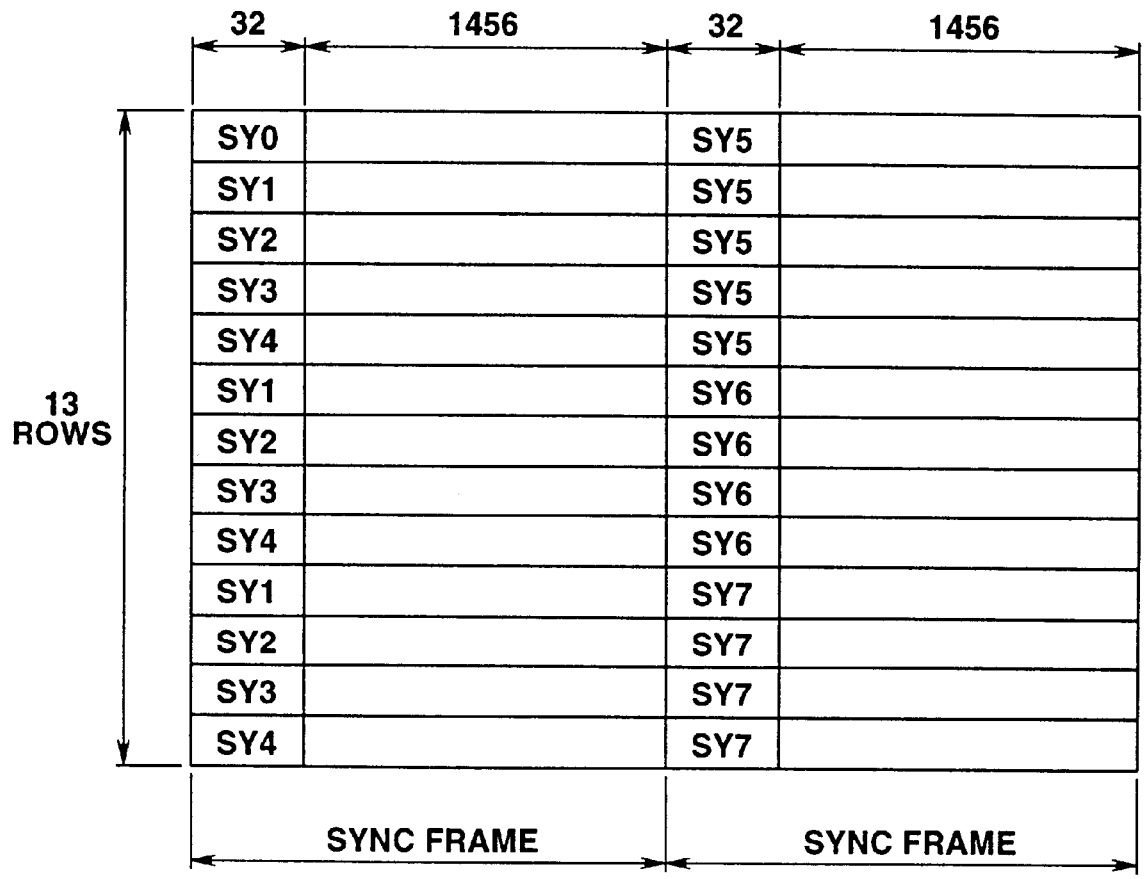
FIG. 29 illustrates an example of a sector signal format.
Figure 31:
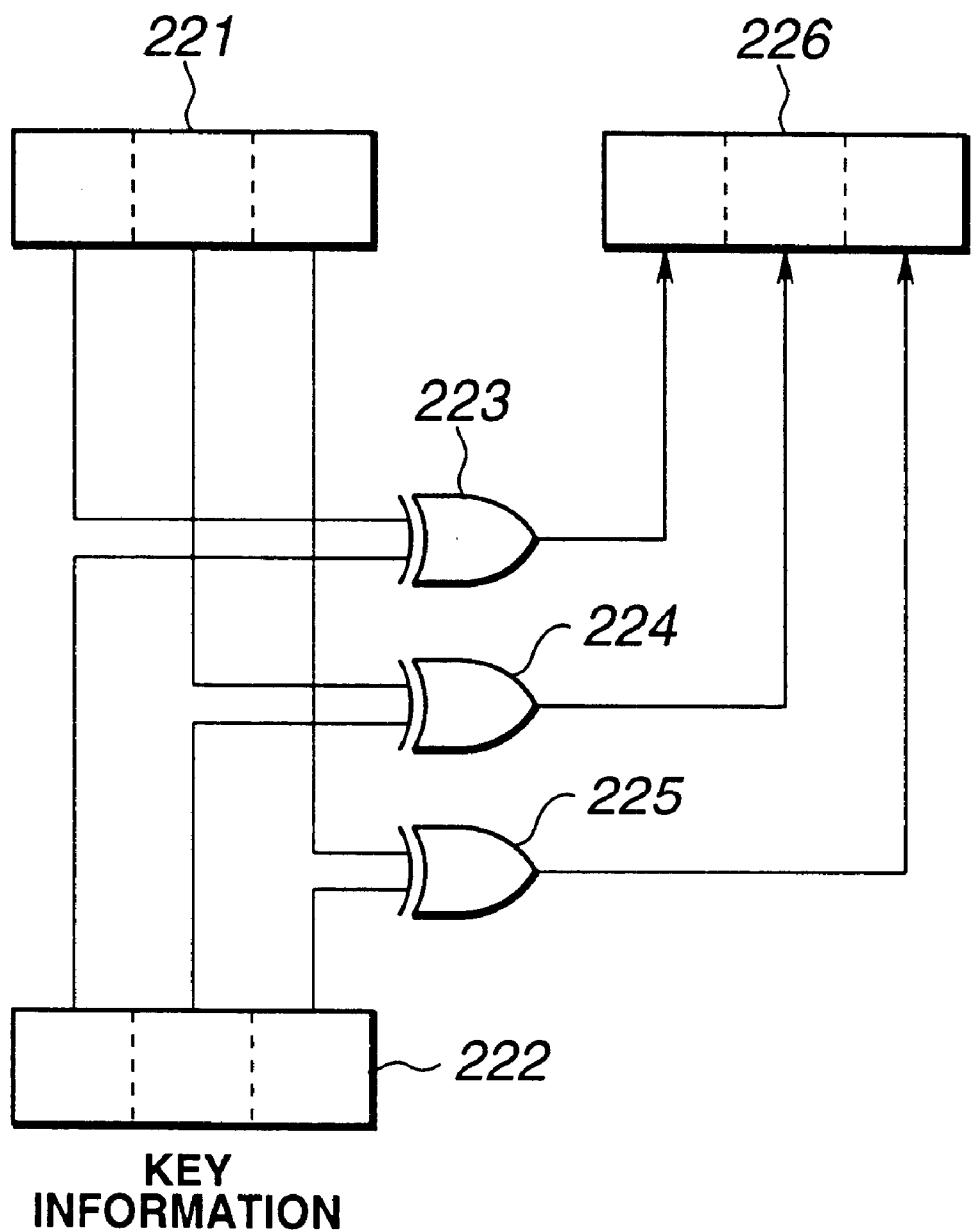
FIG. 31 illustrates another example of ciphering in a sync appendage circuit.

The 182 bytes×208 rows of data, resulting from error correction encoding, are interleaved with respect to rows and separated into 16 13-row groups each of which is associated with a recording sector. Each sector, made up of 182 bytes×13 row, totaling at 2366 bytes, is modulated and two synchronization codes SY are appended per row as shown in FIG. 29. For modulation, 8-to-16 conversion is used as in the above-explained first embodiment. Each row is divided into two sync frames, each of which is made up of a 32-channel-bit synchronization code SY and a 1456-channel-bit data portion. FIG. 29 shows a data structure for one sector obtained on modulation and appendage of synchronization data. The 38688 channel bits of each sector, shown n FIG. 29, corresponds to 2418 bytes prior to modulation.

The modulated output signal of FIG. 29 uses eight sorts of the synchronization codes SY0 to SY7. These synchronization codes SY0 to SY7 represent synchronization patterns of FIG. 30(a) and FIG. 30(b) for the 8–16 conversion states 1, 2 and for the 8–16 conversion states 3 and 4, in dependence upon the above-described 8–16 conversion states, respectively.

Figure 32:
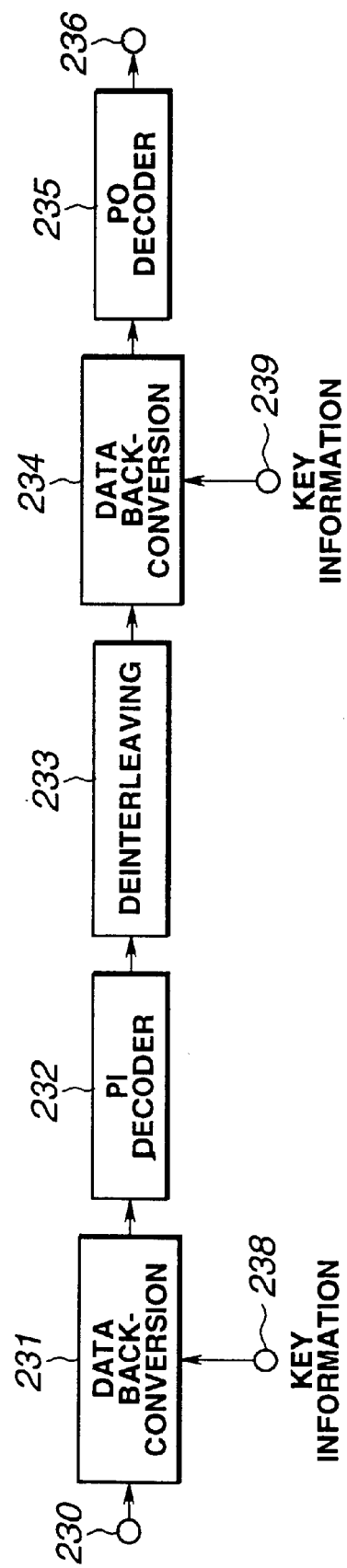
FIG. 32 is a block diagram showing another example of an error correction decoding circuit.

The selection of the eight sorts of the synchronization codes SY0 to SY7 may be changed responsive to the 3-bit key information for effecting the ciphering. That is, respective bits of three-bit data 221 designating the eight sorts of the synchronization codes SY0 to SY7 and the respective bits of the 3-bit key information 222 are Ex-ORed by the three ExOR circuits 223, 224 and 225 to produce new synchronization code designating data 226. This modifies the manner of using the synchronization code in the above frame structure or the position of using the various synchronization codes in the frame structure to effect the ciphering. Of course, data of the three bits may be transposed, substituted or converted by a shift register or by a function conversion depending on the key information The basic structure of a reproducing side, as the counterpart of the recording side structure of the above-described second embodiment of the present invention, is similar to that shown in FIG. 17, and a reverse operation modified in meeting with modified portions in the second embodiment is performed. For example, the reverse operation as a counterpart of the error correction encoding shown in FIG. 27 can be implemented by an error correction decoding circuit shown n FIG. 32.

In this figure, data of the product code of 182 bytes×208 rows of FIG. 28, corresponding to an output of the output terminal 216 of FIG. 27, that is an output signal of the demodulating circuit 115 of FIG. 17, is supplied to an input terminal 230. This data from the input terminal 230 is sent to a data conversion circuit 231 where a reverse operation of the operation performed by the data conversion circuit 215 of FIG. 27 is performed. Output data of the data back-conversion circuit 231 is sent to a PI (inner code) decoder 232 where the decoding as the reverse operation of the operation performed by the PI encoder 214 of FIG. 27, that is error correction employing the PI code, is performed for producing 172 bytes×208 rows of data shown in FIG. 28. Output data of the PI decoder 232 is processed by an operation which is the reverse of the operation performed by the data conversion circuit 213 and subsequently sent to a PO (outer code) decoder 235. The PO decoder 235 performs a decoding operation as a reverse operation of the operation by the PO encoder 211 of FIG. 27, that is error correction employing the PO code, for taking out the original 172 bytes×182 rows of data of FIG. 28 at an output terminal 236. If the key information is used for data conversion by the data conversion circuits 212, 215 of FIG. 27, the key information supplied to each of the terminals 218, 219 may be supplied to terminals 239, 238 of the data back-conversion circuits 234, 231 of FIG. 32 for effecting data back-conversion depending on the key information.

The favorable effect of the above-described second embodiment of the present invention is similar to that of the above-mentioned first embodiment.

In the above-described embodiment of the data recording method according to the present invention, input data is processed with ciphering in at least one of the sector forming step of dividing input digital data in terms of the pre-set data amount, a header appendage step of appending the header, an error correction encoding step, a modulating step for modulation in accordance with a pre-set modulation system, and a synchronization appendage step of appending the synchronization pattern, and the resulting ciphered data is outputted, so that the particular step in which the ciphering has been made also becomes the key for ciphering, thus raising the degree of ease or difficulty in ciphering. The scrambling step of randomizing the data for eliminating the same pattern may also be included among the ciphering steps. There is also a merit that ciphering can be realized easily by simply modifying part of the pre-existing configuration. These effects can be realized with the data recording apparatus, record medium, data reproducing method or data reproducing apparatus.

Since data conversion is done on at least a portion of data handled during error correction encoding, depending on the key information for ciphering, ciphering of a desired level between the level for which data restoration is possible to some extent by error correction encoding and a level for which data restoration is not possible can be realized. This renders possible such control in which reproduction is possible or is not possible for an acceptable error state or for an unacceptable error state, thus enabling accommodation complying with the usage of data or security level.

In addition, ciphering with a larger number of key bits becomes possible in error correction, and ciphering is done in a huge black box such as error correction coding or decoding IC or LSI, thus making it difficult for the general user to decode the ciphering thus significantly raising data security.

In addition, data is ciphered using the pre-set key information and at least a portion of the key information for ciphering is written in an area different from the data recording area on the record medium so that this portion of the key information is read during reproduction and used for deciphering. The key information is not completed within the information in the data recording area of the record medium, thus raising the ciphering difficulty.

In addition, during the scrambling operation mainly aimed at randomizing the data for removing the same patterns in the data string, at least one of the generating polynominal or the initial value is changed responsive to the ciphering key such that the pre-existing scrambling may be directly used for ciphering for realizing the ciphering by a simplified structure.

By the above-described data ciphering, prevention of copying or illicit use can be implemented by'a simplified configuration, while application to security or to charging system may be realized easily.

The present invention is not limited to the above-described embodiments. For example, data conversion may also be by bit addition or a variety of logical operations in addition to by inverters or ExOR circuits as described above. A variety of ciphering techniques, such as data substitution or transposition responsive to the ciphering key information conversion by shift registers or by various function precessing, may also be employed, alone or in combination. Various other modifications can be made without departing from the purport of the invention.

What is claimed is:

1. A data reproducing method comprising;

separating a synchronization signal from a digital signal read out from a data record medium;

demodulating the digital signal separated from the synchronization signal in accordance with a pre-set modulation system;

error correcting and decoding digital data obtained on demodulation;

resolving the error corrected and decoded digital data into sectors;

separating a header portion of a sector structure of the digital data resolved into sectors; and descrambling the digital data separated from the header by varying at least one of an initial value or a generating polynomial based on key information used for ciphering during recording, wherein at least a portion of said key information is selected from the group consisting of producer identification information, dealer identification information, identification information proper to an encoder, identification information proper to an apparatus that produced said record medium, and territory information.

2. The data reproducing method of claim 1 wherein said deciphering is performed by varying said generating polynomial based on said key information.

3. The data reproducing method of claim 1 wherein said key information comprises key information used for separately ciphering said digital signal during recording.

4. The data reproducing method of claim 1 wherein said at least a portion of said key information is said producer identification information.

5. The data reproducing method of claim 1 wherein said at least a portion of said key information is said dealer identification information.

6. The data reproducing method of claim 1 wherein said at least a portion of said key information is said identification information proper to an encoder.

7. The data reproducing method of claim 1 wherein said at least a portion of said key information is said identification information proper to an apparatus that produced said record medium.

8. The data reproducing method of claim 1 wherein said at least a portion of said key information is said territory information.

9. A data reproducing apparatus comprising;

synchronization separation means for separating a synchronization signal from a digital signal read from a record medium;

demodulation means for demodulating the digital signal outputted by the synchronization separation means in accordance with a pre-set modulation system;

error correction and decoding means for error correction and decoding digital data obtained by said demodulation means;

sector resolving means for resolving the digital data outputted by said error correction and decoding means;

header separating means for separating a header portion of a sector structure of the digital data outputted by said sector resolving means; and descrambling means for descrambling the digital data outputted by said header separating means by varying at least one of an initial value or a generating polynomial based on key information used for ciphering during recording, wherein at least a portion of said key information is selected from the group consisting of producer identification information, dealer identification information, identification information proper to an encoder, identification information proper to an apparatus that produced said record medium, and territory information.

10. Data reproducing apparatus of claim 9 wherein said deciphering is performed by varying said generating polynomial based on said key information.

11. Data reproducing apparatus of claim 9 wherein said key information comprises key information used for separately ciphering said digital signal during recording.

12. A data reproducing method comprising the steps of:

separating a synchronization signal from a digital signal read out from a data record medium;

demodulating the digital signal separated from the synchronization signal in accordance with a pre-set demodulation system;

error correction decoding the demodulated digital data;

resolving the error corrected and decoded digital data into pre-set sectors; and separating a header part of a sector structure of the digital data resolved into sectors;

wherein an input has been ciphered in at least one step for recording that is a counterpart to at least the synchronization signal separation step, and the input is deciphered in at least the synchronization signal separation step.

13. A data reproducing method comprising the steps of:

separating a synchronization signal from a digital signal read out from a data record medium;

demodulating the digital signal separated from the synchronization signal in accordance with a pre-set demodulation system;

error correction decoding the demodulated digital data;

resolving the error corrected and decoded digital data into pre-set sectors; and separating a header part of a sector structure of the digital data resolved into sectors;

wherein an input has been ciphered in at least one step for recording that is a counterpart to at least the resolving step, and the input is deciphered in at least the resolving step.

14. A data reproducing method comprising the steps of:

separating a synchronization signal from a digital signal read out from a data record medium;

demodulating the digital signal separated from the synchronization signal in accordance with a pre-set demodulation system;

error correction decoding the demodulated digital data;

resolving the error corrected and decoded digital data into pre-set sectors; and separating a header part of a sector structure of the digital data resolved into sectors;

wherein an input has been ciphered in at least an error correction coding step, which is a counterpart to said error correction decoding step, just after parity bits are added thereto by error correction coding and before modulation of the error correction coded input, and a deciphering operation is performed in a reverse order in said error correction decoding step to obtain deciphered data.

15. The data reproducing method as claimed in claim 14 wherein the ciphering during the error correction coding step is performed after said parity bits are added to said input at a time just prior to a data re-arraying operation of said error correction coding.

16. A data reproducing method comprising the steps of:

separating a synchronization signal from a digital signal read out from a data record medium;

demodulating the digital signal separated from the synchronization signal in accordance with a pre-set demodulation system;

error correction decoding the demodulated digital data;

resolving the error corrected and decoded digital data into pre-set sectors; and separating a header part of a sector structure of the digital data resolved into sectors;

wherein an input has been ciphered in at least an error correction coding step which is a counterpart to said error correction decoding step, in which a first portion of a ciphering operation is performed on the input immediately prior to error correction coding thereof and a second portion of the ciphering operation is performed after parity bits are added to the input via the error correction coding;

whereby a deciphering operation is performed in a reverse order in said error correction decoding step to obtain deciphered data.

* * * * *